US012609953B2

(12) United States Patent     (10) Patent No.: US 12,609,953 B2

Pattanaik et al.     (45) Date of Patent: Apr. 21, 2026

(54) SYSTEMS AND METHODS FOR ANOMALY DETECTION IN TIME SERIES DATA USING DYNAMIC PAIRING

(71) Applicant: The Bank of New York Mellon, New York, NY (US)

(72) Inventors: Sarthak Pattanaik, New York, NY (US); Venkat Kambhampati, New York, NY (US); Abhishek Singh, Pune (IN); Sunita Kanchinadam, New York, NY (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 18/806,441

(22) Filed: Aug. 15, 2024

(65) Prior Publication Data

US 2026/0052164 A1    Feb. 19, 2026

(51) Int. Cl.
*H04L 9/40*      (2022.01)

(52) U.S. Cl.
CPC ................................ *H04L 63/1425* (2013.01)

(58) Field of Classification Search
CPC .................................................. H04L 63/1425
See application file for complete search history.

(56) References Cited

U.S. PATENT DOCUMENTS 9,367,872 B1 * 6/2016 Visbal ................. H04L 63/1416
9,984,334 B2 5/2018 Nikovski et al.

2013/0132385 A1 * 5/2013 Bullotta .............. G06F 16/2477
                               707/736
2020/0242491 A1 * 7/2020 To ............................ G06N 5/02
2024/0427776 A1 * 12/2024 Gorman .................. G06F 9/542

FOREIGN PATENT DOCUMENTS

EP      3916667 A1    12/2021

OTHER PUBLICATIONS

International Search Report and Written Opinion for PCT/US2025/041663 mailed Nov. 20, 2025 (Applicant—The Bank of New York Mellon) (11 Pages).
Kim, Y., et al. "Stock fraud detection using peer group analysis. " Expert Systems with Applications 39.10 (2012): 8986-8992.
Naraoka, M., et al. "Explaining Dynamic Changes in Various Asset's Relationships in Financial Markets." The Review of Socionetwork Strategies 15.2 (2021): 597-611.

* cited by examiner

*Primary Examiner* — Viet D Vu
(74) *Attorney, Agent, or Firm* — NORTON ROSE FULBRIGHT US LLP

(57) ABSTRACT

Systems, methods, and computer-readable storage media facilitating anomaly data detection are disclosed. In the disclosed embodiments, asset pairs may be identified based on relationship information extracted from time series data. A real-time data stream may be monitored in view of the relationship information, and an anomaly in the asset pairs is detected in real time based on behaviors of assets relative to assets in identified asset pairs. Detection of an anomaly may trigger generation of a control signal that may initiation investigation of the anomaly and other actions to mitigate the impact of the anomaly.

20 Claims, 7 Drawing Sheets

200

210 Data Reception 220
1. Correlation Score
2. Absolute Difference Score
3. Asset Group Vectoral Similarity
4. Asset Group Graphical Similarity 230 Similarity Score 240 Top-X Pair Selection and Validation 250 Real-time Data Stream Reception 260 Anomaly Detection & Control 270 Continuous Training 202
Data Pair
Identification 204
Anomaly
Detection & Control 206
Feedback &
Training

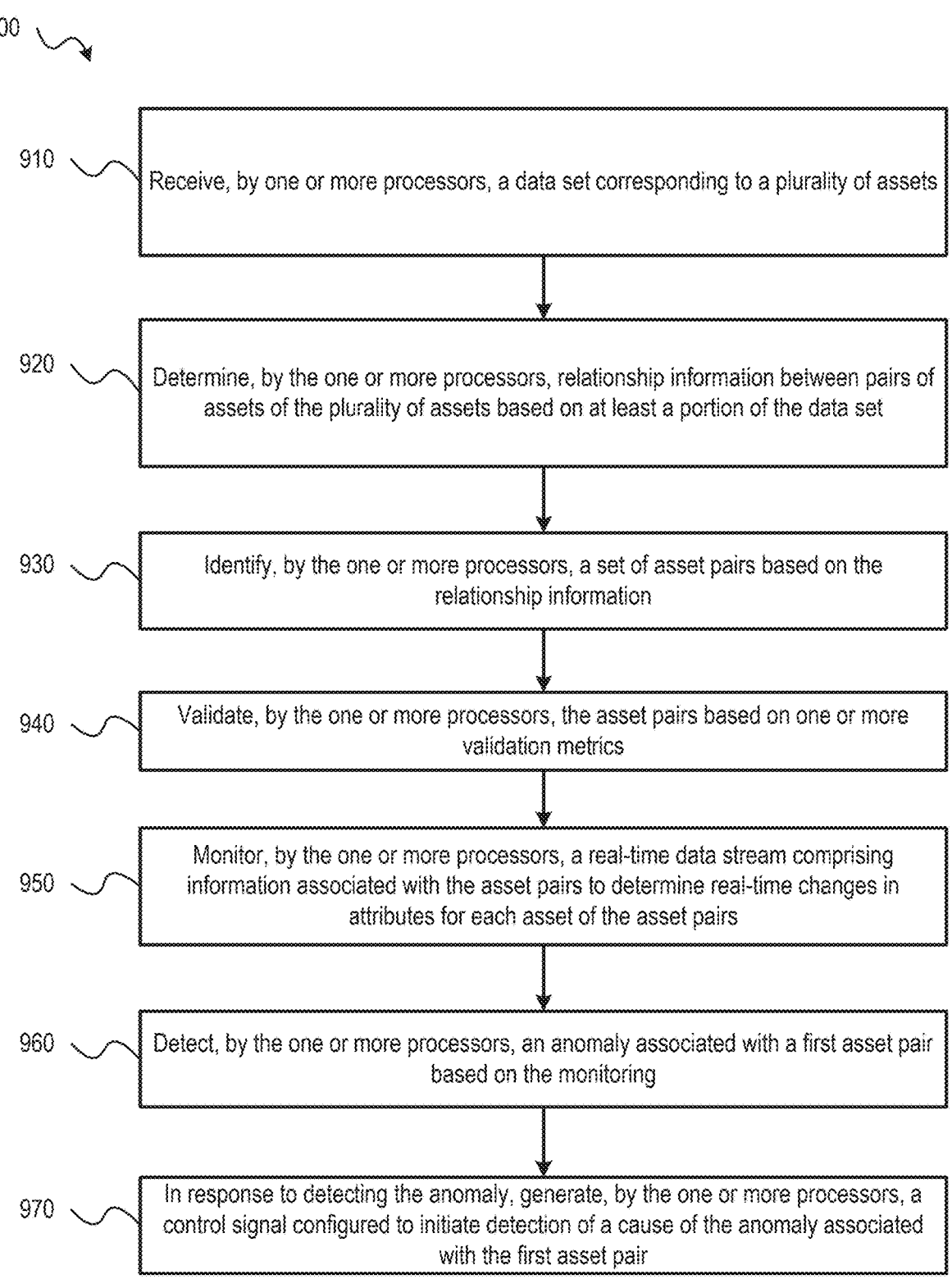

900

910 — Receive, by one or more processors, a data set corresponding to a plurality of assets 920 — Determine, by the one or more processors, relationship information between pairs of assets of the plurality of assets based on at least a portion of the data set 930 — Identify, by the one or more processors, a set of asset pairs based on the relationship information 940 — Validate, by the one or more processors, the asset pairs based on one or more validation metrics 950 — Monitor, by the one or more processors, a real-time data stream comprising information associated with the asset pairs to determine real-time changes in attributes for each asset of the asset pairs 960 — Detect, by the one or more processors, an anomaly associated with a first asset pair based on the monitoring 970 — In response to detecting the anomaly, generate, by the one or more processors, a control signal configured to initiate detection of a cause of the anomaly associated with the first asset pair

FIG. 9

SYSTEMS AND METHODS FOR ANOMALY DETECTION IN TIME SERIES DATA USING DYNAMIC PAIRING

TECHNICAL FIELD

The present disclosure generally relates to detection of anomalies and more specifically to systems and methods providing for dynamic and automated detection and mitigation of anomalies based on real-time data feeds using dynamic pairing with feedback learning techniques.

BACKGROUND

Modern trading systems utilized to buy and sell traded assets (e.g., exchange traded funds (ETFs), mutual funds, stocks, bonds, options, calls, puts, futures contracts, and the like) are increasingly dependent on technology. For example, modern trading systems utilize network connections to enable traders to submit orders to exchanges that provide markets for the purchase and sale of traded assets. The transition to digital platforms has allowed new participants to become involved in trading activity but has also created demand for the most up to date data, which can be critical to some traders and market participants. In addition to the requirements and desires of traders, technology has also imposed technical challenges to other market participants. For example, as technology for engaging in trading activity advanced, the number of trades executed per day has significantly increased. Certain market participants, such as fund managers who may manage ETFs and/or mutual funds, are responsible for providing certain types of information regarding the funds they manage and the deadline to do so may be shortly after the conclusion of the trading day. For example, the trading activity may close at 4:00 eastern time for a stock exchange where traded assets are bought and sold (e.g., the New York Stock Exchange) and fund managers may need to publish the net asset value (NAV) of the funds they manage by 6 PM eastern time in order to meet certain publishing deadlines (e.g., internal and/or third party publishing deadlines).

Presently, fund managers must manually review trading activity to detect anomalies in traded assets they manage, which may impact the NAV calculations performed at the conclusion of each trading day. The detection process presently used is entirely manual, using spreadsheet-type data that may be reviewed by an analyst to identify anomalies. These manual processes are time consuming and fail to catch all anomalies, which may lead to some inaccuracies in published NAVs on a given day. Another challenge for these manual processes is that changes to funds may occur over time, which may change the behavior of those funds. This can make identification of anomalies more difficult using the current manual techniques (e.g., since an analyst may have understood a traded asset to exhibit a certain behavior, but that behavior may be altered when the composition of a fund changes), allowing new or emerging behaviors to go unnoticed or undetected for some period of time.

SUMMARY

To overcome the challenges described above, aspects of the present disclosure provide systems, methods, and computer-readable storage media facilitating dynamic and automated anomaly data detection and control are disclosed. In the disclosed embodiments, a device may include an anomaly detection engine configured to perform various operations, including: identifying pairs of assets (referred to herein as "asset pairs") based on relationship information extracted from a data set; detecting an anomaly associated with a asset pair; and initiating one or more operations to determine a cause of and/or resolve any detected anomalies. The asset pairs may be determined by identifying relationships between different assets, where assets having target relationships (e.g., exhibiting similar behaviors) may be identified as asset pairs. For example, the asset pairs may be identified by determining correlations between two assets based on time series data associated with the assets. In an aspect, the correlations between different assets may be determined using a combination of various metrics (e.g., a correlation score metric, an absolute difference score metric, an asset group vectoral similarity metric, and/or an asset group graphical similarity metric) determined based on the time series data. After the asset pairs are identified, anomalies with respect to assets may be detected based on monitoring of a real-time data stream including information associated with the assets, where anomalies may be detected based on changes in attributes of the assets and their respective asset pairs. In response to detection of an anomaly, a control signal may be generated to initiate detection of a cause of the anomaly and/or control or correct the anomaly.

Utilizing the techniques disclosed herein enables anomaly detection processes to be completed more quickly and with a higher degree of accuracy, as well as account for and detect new and emerging asset behaviors that may be anomalous more quickly. For example, the techniques described herein may reduce the false positive results because anomalies may be detected based on relationships between assets, which enables behavior of some assets to be used as a reference with respect to the behavior of another asset in the relationship. Further, the techniques described herein may further reduce the false positive result or improve the accuracy of the asset pair identification by using feedback learning improve the detection of asset relationships and refine the calculations used to quantify those relationships. In addition, the techniques described herein may detect the anomaly data in real-time or near real-time because the anomaly data detection is performed in a correlated time series data sets.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 9 is a flow diagram illustrating an example process for dynamic and automated anomaly data detection and control in accordance with aspects of the present disclosure.

Figure 1:
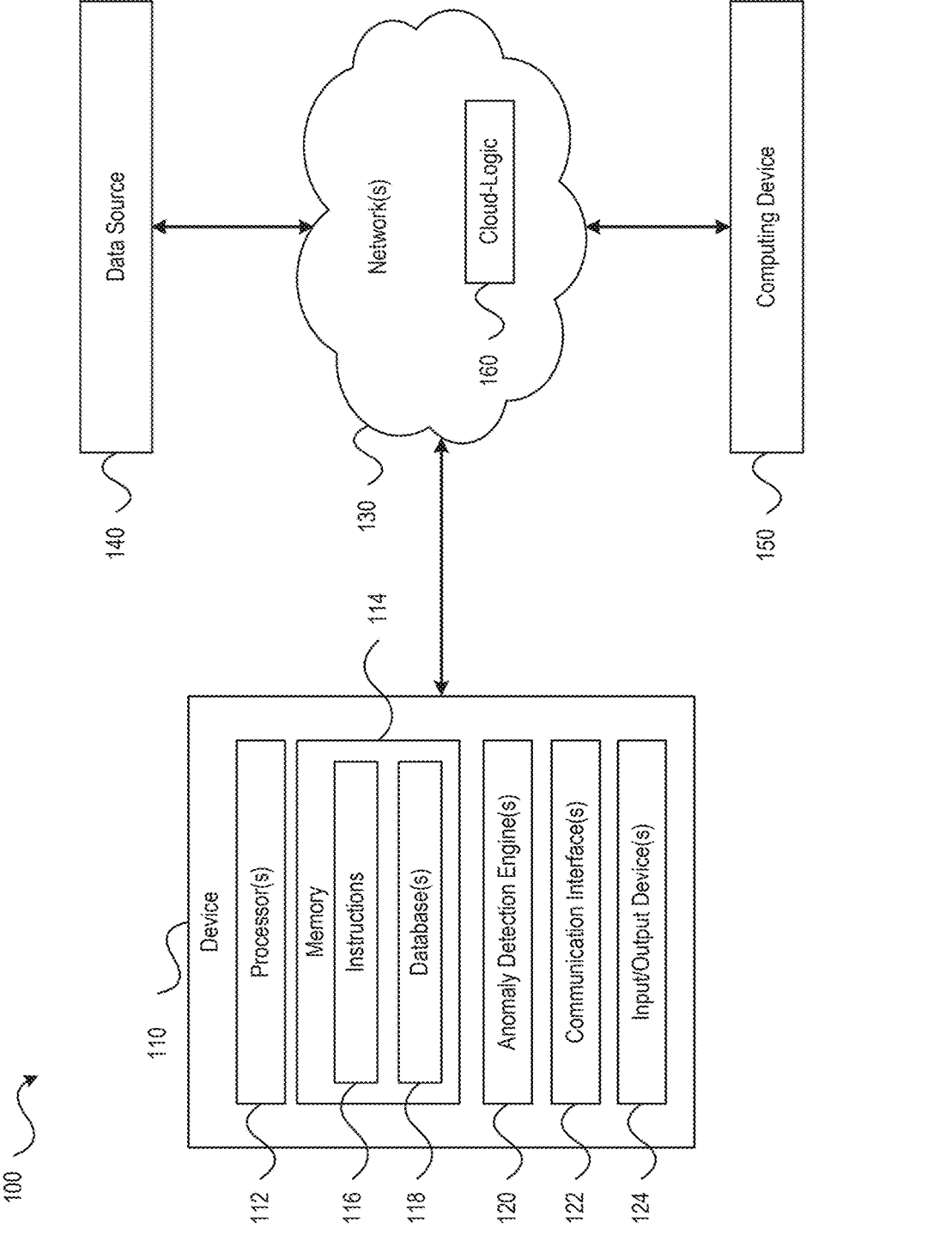
FIG. 1 is a block diagram illustrating an example system for performing dynamic and automated anomaly data detection in a real-time data stream and control processes in accordance with aspects of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

As will become apparent from the description below, aspects of the present disclosure provide new processes for automatic and dynamic detection of anomalies associated with assets in real-time based on time series data. In the description that follows non-limiting examples of detecting anomalies using the concepts disclosed herein are described with reference to detection of anomalies associated with traded assets. However, it should be understood that such examples are provided by way of illustration, rather than by way of limitation and the anomaly detection methods and techniques described herein may be readily used to detect anomalies with respect to other types of assets. For example, assets for which the anomaly detection techniques described herein may be applied may include network elements (e.g., devices in a network that may exhibit similar behaviors or provide similar functionalities), entities, or other elements having behaviors that enable anomaly detection via analysis of similar pairs and/or time series data using the techniques described herein. In the disclosed embodiments, a device may include an anomaly detection engine configured to identify traded asset pairs from among many trade assets based on a data set. The traded asset pairs may be identified by determining correlations between different ones of the traded assets included in the data set. For example, the correlations of traded assets may be determined using a combination of various metrics (e.g., a correlation score metric, an absolute difference score metric, an asset group vectoral similarity metric, and/or an asset group graphical similarity metric). The traded asset pairs may be used to detect anomalies associated with a traded asset. The real-time detection of an anomaly may be determined based on a data stream including information associated with the traded assets, where the anomalies may be detected based on real-time changes in attributes associated with the traded assets. For example, an anomaly may be detected based on a metric associated with changes to traded assets of a traded asset pair, where the changes may be detected based on data included in the real-time data stream. As a non-limiting example, an anomaly may be detected when the metric(s) corresponding to a particular traded asset of a traded asset pair is higher than a threshold (e.g., a predetermined threshold or a relative threshold). In response to detection of the anomaly, the device may generate a control signal to initiate detection of a cause of the anomaly and/or control the anomaly.

Utilizing the techniques disclosed herein to configure various aspects of a dynamic and automated correlated data identification and anomaly data detection process enable anomaly data detection processes may be completed more quickly. For example, the techniques described herein may reduce the false positive results because the anomaly data may be detected in correlated time series data. Further, the techniques described herein may further reduce the false positive result or improve the accuracy of the traded asset pair identification by adjusting the model to detect correlated traded asset pairs based on the anomaly data detection. In addition, the techniques described herein may detect the anomaly data in real-time or near real-time because the anomaly data detection is performed in a correlated time series data sets.

Referring to FIG. 1, a block diagram illustrating a system for automatically and dynamically detecting anomalies in accordance with aspects of the present disclosure is shown as a system 100. As shown in FIG. 1, the system 100 includes a device 110. In an aspect, the functionality described with respect to the device 110 may be implemented via a cloud, as shown by cloud-logic 160, rather than via a server or other type of computing device. The device 110 includes one or more processors 112, a memory 114, one or more anomaly detection engines 120, one or more communication interfaces 122, and one or more input/output (I/O) devices 124. Each of the one or more processors 112 may be a central processing unit (CPU), a graphics processing unit (GPU), or other computing circuitry (e.g., a microcontroller, one or more application specific integrated circuits (ASICs), and the like) and each processor 112 may have one or more processing cores. The memory 114 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 114 may store instructions 116 that, when executed by the one or more processors 112, cause the one or more processors 112 to perform the operations described in connection with the device 110 with reference to FIGS. 1-9. The one or more communication interfaces 122 may be configured to communicatively couple the device 110 to the one or more networks 130 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like). The I/O devices 124 may include one or more display devices, a keyboard, a stylus, one or more touchscreens, a mouse, a trackpad, a camera, one or more speakers, haptic feedback devices, or other types of devices that enable a user to receive information from or provide information to the device 110.

The one or more anomaly detection engines 120 may be configured to provide functionality to support detection of anomalies in accordance with the concepts described herein. For example, the anomaly detection engine(s) 120 may be configured to identify traded asset pairs based on a data set and detect an anomaly associated with a traded asset using a real-time data stream, such as a data stream associated with traded asset data. The time series data and/or data streams monitored during anomaly detection may be obtained from one or more data sources 140. The one or more anomaly detection engines 120 may generate one or more metrics and/or use one or more machine learning techniques to produce an anomaly detection model that may be used to perform anomaly detection. In some examples, the one or more metrics may be used to identify the traded asset pairs, detect anomalies, or both, as described in more detail below. the anomaly detection engine 120 may be configured to generate a control signal configured to initiation operations to determine a cause of the anomaly. The control signal may additionally or alternatively be configured to initiate operations to mitigate the anomaly (or mitigation may be performed after the cause is detected). The control signal may be provided to one or more computing devices 150, such as computing devices used by analysts responsible investigating anomalies or other types of devices, as described herein.

Figure 2:
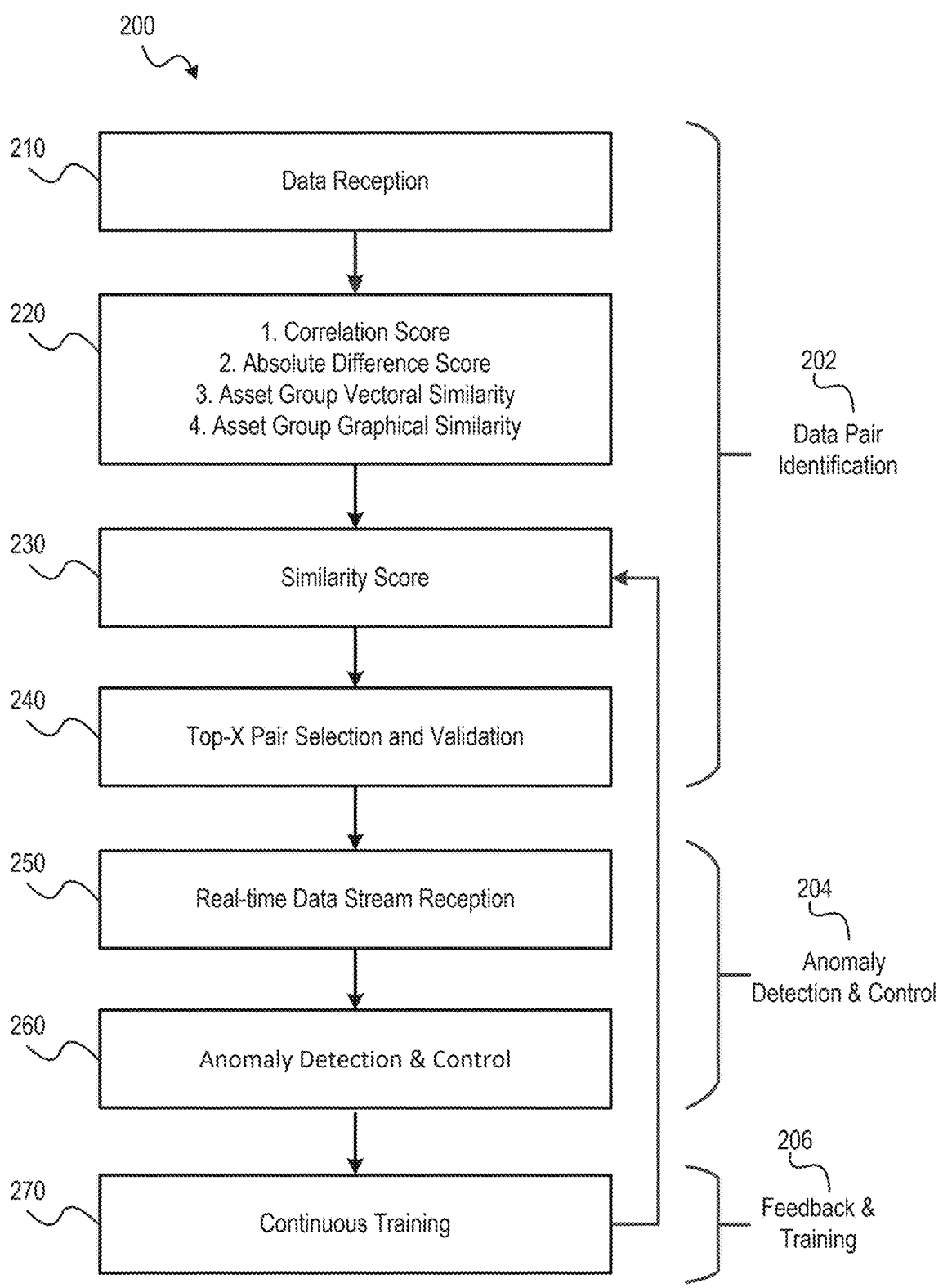
FIG. 2 is a flow diagram illustrating an example process for dynamic and automated anomaly data detection and control in accordance with aspects of the present disclosure.

FIG. 2 is a flow diagram illustrating an example process for dynamic and automated anomaly data detection and control in accordance with aspects of the present disclosure. It is noted that the steps or operations described with reference to FIG. 2 are meant to further illustrate aspects of the functionality provided by the one or more anomaly detection engines 120 of FIG. 1. Thus, it is to be understood that the functionality described below with reference to FIG. 2 may be provided by the device 110, the one or more processor 112, the memory 114, and/or the one or more anomaly detection engines 120 illustrated in FIG. 1. The steps or operations of the process 200 may be stored as instructions (e.g., the instructions 116 and/or the one or more anomaly detection engines 120 of FIG. 1) that, when executed by one or more processors (e.g., the one or more processors 112 and/or the one or more anomaly detection engines 120 of FIG. 1), cause the one or more processors to perform the steps of the process 200.

The process 200 generally includes three phases: (1) pair identification 202, (2) anomaly detection and control 204, and/or (3) feedback and training 206. In an aspect, data pair identification 202 may include data reception at step 210, metrics calculation at step 220, similarity score determination at step 230, and/or data pair selection and validation at step 240. The anomaly detection and control 204 may include real-time data stream reception at step 250 and/or anomaly detection and control at step 260. The feedback and training 206 may include continuous training at step 270. A particular implementation may omit some or all illustrated features or steps, and may not require some illustrate features or steps to implement all embodiments.

At step 210, the process 200 may receive a data set. The data set may include information associated with or corresponding to a plurality of traded assets. In an aspect, the data set received at step 210 may include time series data for each of the traded assets. For example, the traded assets may include a first traded asset and a second traded asset, and the time series data may include first time series data associated with the first traded asset and second time series data associated with the second traded asset. The information included the time series data may be associated with a time period (e.g., one or more seconds, one or more minutes, one or more hours, one or more days, one or more months, one or more years, another suitable time period, or a combination thereof). The time series data for each of the traded assets may be sampled at one or more frequencies (e.g., a sampling frequency or interval of one or more milliseconds, seconds, minutes, hours, days, weeks, or other sampling frequencies). As non-limiting examples, a traded asset may be an exchange traded fund (ETF), a mutual fund, a stock, or other forms of traded assets (e.g., options, calls, puts, futures contracts, and the like).

As explained below with reference to FIG. 3, the time series data associated with each traded asset may include values (e.g., stock price, net asset value (NAV), etc.). Data sets obtained from the one or more data sources (e.g., the one or more data sources 140 of FIG. 1) may additional include other types of information and metrics (e.g., volume, relative strength index (RSI), Return on Investment (ROI) (measures the money a company has made or lost on an investment), Earnings Per Share (EPS) (a measure of a company's profit), Price-to-Earnings Ratio (P/E ratio) (compares a company's current price to its per-share earnings), Return on Equity (ROE) (measures a corporation's profitability), CAGR (Compound Annual Growth Rate), Price to Book Ratio (assesses a company's value on paper against its market price), Debt to Equity Ratio (indicates a company's financial leverage), Free Cash Flow Ratio (measures a company's ability to generate cash, PEG Ratio: Evaluates a stock's valuation relative to its growth rate, Payout Ratio (indicates the proportion of earnings paid out as dividends), or other metrics), characteristics (e.g., industry, age, exchange(s) where the asset is traded, etc.), requirements, and/or any other suitable information that corresponds to the traded asset. For example, if the traded asset is a stock or ETF, the time series data may indicate value changes of the ETF over time according to the sampling frequency of the time series data. The history of value changes for the ETF may form a time-series representing the change in price or value of the ETF over time. Additionally, the time series data may include other types of data corresponding to the traded asset (e.g., stocks and other traded assets making up the ETF or mutual fund, a list of traded assets held in the fund, a manager of the fund, time series data associated with each traded asset held in the ETF, etc.).

In an aspect, traded assets may be associated with an asset class such as equities (e.g., stocks), fixed income (e.g., bonds), commodities, real estate, cash equivalents and money market instruments, derivatives, futures, and the like, and the time series data received at step 210 may include information indicating an asset class for each traded asset. In some examples, the time series data associated with traded assets may include information associated with a NAV of the traded assets, which may move dynamically as the price or value of the traded asset (or a set of traded assets making up the traded asset, such as an ETF, mutual fund, and the like) changes. In an aspect, the time series data may only include a time series of NAV changes (e.g., percent change in NAV) over time, which may reduce a size of the time series data and therefore, reduce memory requirements of the device 110. In an aspect, the time series data may include data in different formats. For example, first time series data and second time series data may be heterogeneous data sets received from different data sources 140 such that the first time series data has a different data format than the second time series data. In such examples, the process may normalize the first time series data and the second time series data. For example, normalization may include associating a unique identifier with each of the traded assets, which may be identified using different identifiers in data sets obtained from different data sources. The normalization may also include adjusting values in the time series data (e.g., to a common period of time or converting units in the time series to a common unit of measure).

Figure 3:
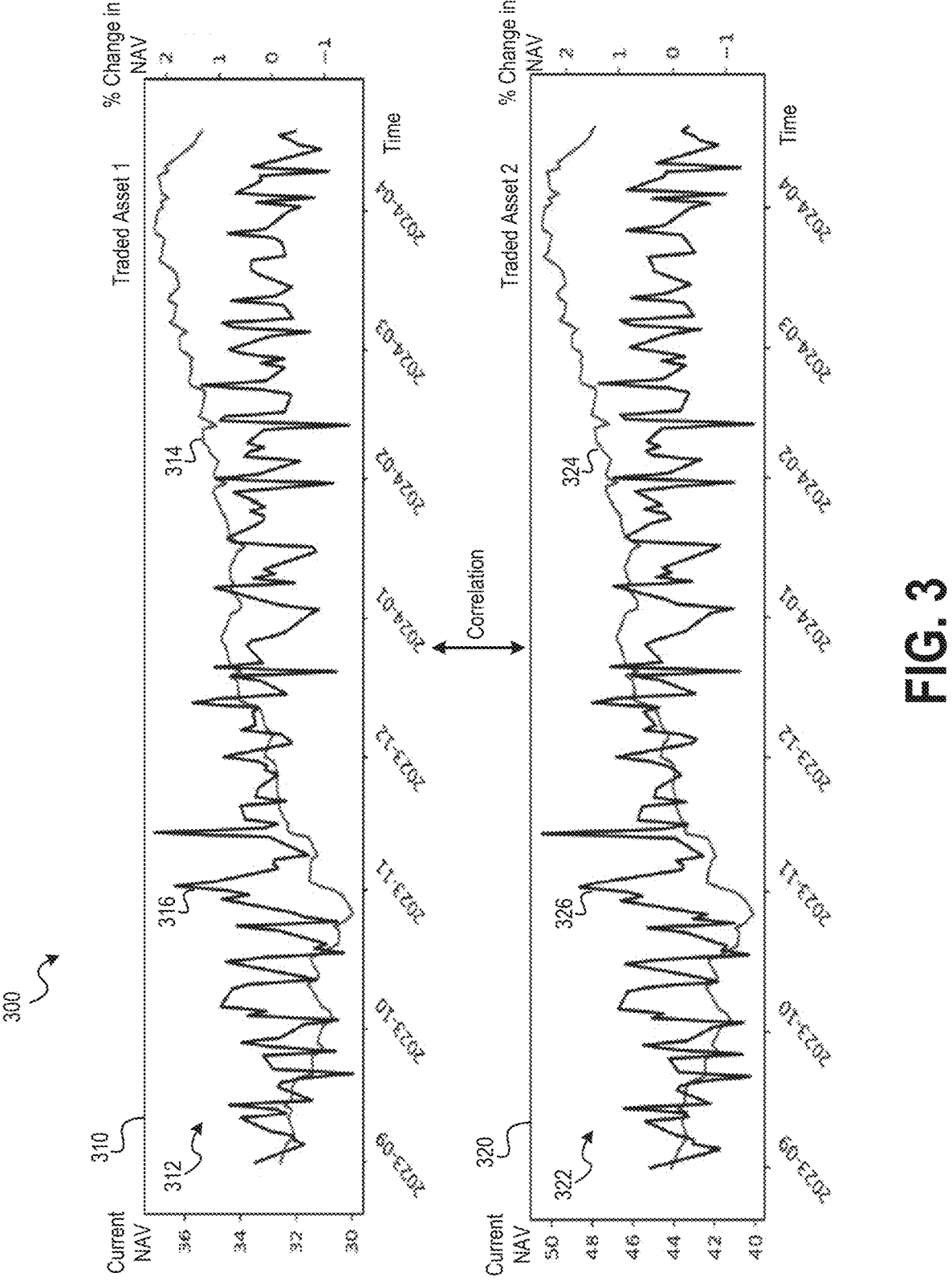
FIG. 3 shows an example data set 300 including multiple time series data corresponding to multiple traded assets in accordance with aspects of the present disclosure.

As a non-limiting example, and referring to FIG. 3, aspects of an example data set 300 including time series data corresponding to a traded asset in accordance with aspects of the present disclosure is shown. For example, in FIG. 3 the data set 300 is shown to include data associated with a first traded asset 310 and a second traded asset 320. It is noted while FIG. 3 shows the data set 300 including information (e.g., time series and other forms of data) corresponding to two traded assets, in practice the data set 300 may include data corresponding to thousands, tens of thousands, or even hundreds of thousands of traded assets. In the example shown in FIG. 3, the data set 300 includes time series data associated with the first traded asset 310, shown as time series data 312, and second time series data 322 associated with the second traded asset 320, shown as time series data 322. In some examples, the time series data of the data set 300 may include time series data representing a historical NAV for traded assets over a time period. For example, the time period may be a one or more days, weeks, months, years, or combination thereof (e.g., from September 2023 to April 2023). Additionally or alternatively, the time series data of the data set 300 may include time series data representing a historical percentage change in NAV for the traded assets over the time period.

To illustrate, in FIG. 3 the time series data 312 includes time series 314 representing NAV of the traded asset 310 over time and time series 316 representing a percentage change in NAV of the traded asset 310 over time, and the time series data 322 includes time series 324 representing NAV of the traded asset 320 over time and time series 326 representing a percentage change in NAV of the traded asset 320 over time. It is noted that where the traded assets 310, 320 are funds (e.g., ETFs, mutual funds, etc.), the NAV may be determined based on several factors, such as the traded assets held in the fund, the percentage makeup of each traded asset held in the fund (e.g., an ETF may have 3 traded assets in it and the percentage makeup of the ETF may be 40% traded asset 1, 25% traded asset 2, and 35% traded asset 3, where the NAV of the ETF is based on the value of the 3 traded assets and the percentage makeup each traded asset within the ETF), or other factors. In some examples, the time series data 312 may include time series data representing a historical NAVs for the first traded asset 310 over a time period (e.g., from September 2023 to April 2023) and/or time series data representing a historical percentage change in NAV for the first traded asset 310 over the time period. In some examples, the time series data 312 may include time series data representing a historical NAVs for the first traded asset 310 over a time period (e.g., from September 2023 to April 2023) and/or time series data representing a historical percentage change in NAV for the first traded asset 310 over the time period. The data set 300 may include similar types of time series data for a plurality of other traded assets, which may include hundreds, thousands, tens of thousands, or even hundreds of thousands of traded assets.

It is noted that the time series data 312, 322 may be obtained at one or more sampling time intervals, such as a sampling time interval of one or more seconds, minutes, hours, days, weeks, months, and the like. Furthermore, it is noted that the data set 300 may be generated based on data obtained from multiple different data sources (e.g., the data source(s) 140 of FIG. 1). In an aspect, the data obtained from the different data sources may be normalized prior to obtaining or generating the data set 300 for use in accordance with aspects of the present disclosure. For example, normalization may include associating a unique identifier with each traded asset, normalizing the sampling interval of the data obtained from each data source to a common sampling interval (e.g., milliseconds, seconds, minutes, hours, days, weeks, years, etc.), restricting the time series data for each traded asset to a particular time interval (e.g., one or more days, weeks, months, years, or combination thereof), or other normalization operations. Normalizing the data sets obtained from different data sources enables more accurate performance of subsequent processes, such as identification of traded asset pairs, detection of anomalous behaviors, and other operations described herein. For example, if disparate and different data sources utilize different identifiers to designate the same traded assert detection of traded asset pairs and generation of the data set 300 may be more difficult and could lead to false positive anomaly detections and missed anomaly detections, which may prevent actions to mitigate the impact of anomalies from being performed entirely or at least in a timely manner.

Referring back to FIG. 2, at step 220, the process 200 may determine relationships between different traded assets based on the time series data. For example, a relationship between the traded assets 310, 320 may be determined based on analysis of the time series data 312, 322 of FIG. 3. In an aspect, the relationships between traded assets may be determined based at least in part on similarities between the traded assets. The similarities may be determined based on correlation metrics (e.g., correlation scores), similarity of asset groups associated with traded assets, similarity of historical NAV changes, or other measures of similarity. Using step 220, the process 200 may determine whether the traded asset 310 and the traded asset 320 should be identified as a traded asset pair based on the data set obtained at step 210 (e.g., based on relationship information determined based on the time series data 312 and the time series data 322). For example, the determined relationship information may indicate the traded assets 310, 320 are correlated with respect to percentage change in NAV (e.g., the NAV of traded assets 310, 320 make similar percentage changes at any particular time over a time period). As another example, relationship information may be determined based on whether the traded assets 310, 320 below to similar asset groups or traded assets held in an ETF have similar asset group compositions. In an aspect, relationship information between traded assets may be based on an ensemble approach using multiple metrics, such as a correlation score metric (i.e., a first metric), an absolute difference score metric (i.e., a second metric), an asset group vectoral similarity metric (i.e., a third metric), and/or an asset group graphical similarity metric (i.e., a fourth metric). Example metrics that may be used to determine relationship informa-
tion during traded asset pair identification in accordance
with the present disclosure are described in more detail
below.

In an aspect, a correlation score metric may use to
determine a ratio of covariance between the time series data
for two traded assets, such as a ratio of covariance between
the time series data 312, 322. For example, the correlation
score may be determined by an example equation:

$$\text{Correlation Score } (r) = \frac{\sum z_x z_y}{N} = \frac{\sum_{t=1}^{n}(x_t - \bar{x})(y_t - \bar{y})}{\sqrt{\sum_{t=1}^{n}(x_t - \bar{x})^2}\sqrt{\sum_{t=1}^{n}(y_t - \bar{y})^2}},$$

wherein $x_t$ is the first time series data, x is the mean of the
first time series data, $y_t$ is the second time series data, $\bar{y}$ is the
mean of the second time series data, t is a time instance of
the first and second time series data. For example, the
correlation score metric may measure the degree of corre-
lation of movements between the first and second time series
data. The correlation score metric may be a deduced metric
that checks the correlation between the NAV percentage
changes of two time series data (the time series data 312
associated with the traded asset 310 and the time series data
322 associated with the traded asset 322). For example,
when the correlation score between the two time series data
exceeds a threshold correlation score (e.g., greater than (>)
0.80, >0.85, >0.90, or >0.99), the correlation score suggests
that the percentage change of the two time series over period
of time (e.g., more than 6 months) have been strongly
similar. In an aspect, two traded assets may be identified as
a traded asset pair if the correlation score satisfies the
threshold correlation score. However, as noted above, in
some aspects an ensemble approach may be utilized and in
such approaches the correlation score may be one of several
metrics that are considered when identifying traded asset
pairs in accordance with the concepts described herein. It is
noted that the percentage change in NAV may be determined
based on NAV at a first point in time relative to a second
point in time (e.g., the NAV at the start of a trading day
relative to the NAV at the end of the trading day or at a point
in time during the trading day).

An absolute difference score metric may represent an
average absolute disparity between the percentage asset
group allocations of a specific pair of traded assets (e.g., two
ETFs, mutual funds, and the like). For example, the absolute
difference score may be determined based on a sum of
absolute difference in allocation percentage across each of
the asset groups or classes. In some examples, the absolute
difference score may be determined by an example equation:

$$\text{Absolute Difference Score} = \sum_{i=1}^{n}|x_i - y_i|,$$

wherein i is $i^{th}$ asset group or class, n is the total number
of asset groups of the time series data, $x_i$ is the alloca-
tion percentage of the $i^{th}$ asset class or group for the first
traded asset (x), and $y_i$ is allocation percentage of the $i^{th}$
asset class or group for the second traded asset (y). As
a non-limiting example, the absolute difference score
for two traded assets (e.g., two mutual funds) may be
2.148231 and 0, respectively. In such examples, the
absolute difference score or an allocation spread score
may be 0.12. Allocation spread score may be a relative mean absolute difference score of the absolute differ-
ence of all the asset group allocations between both the
traded assets in benchmarking. For example, suppose
that 97.858275 is the allocation percentage into the
asset group for a traded asset (e.g., a master traded
asset) and the allocation percentage into the asset group
for other traded assets in pairs with the traded asset
(e.g., sibling or sister traded assets) in scope for bench-
marking is 100.027652. In such a scenario, the alloca-
tion spread score may be 2.169378, which is the
absolute difference between allocations percentages
(e.g., 197.85825-100.0276521).

An asset group vectoral similarity metric may be used to
determine a vectoral similarity score based on vector rep-
resentations of the traded assets (e.g., also referred to as an
asset group vectoral similarity score). For example, the
process 200 may represent the traded assets in a vector space
having dimensions corresponding to the asset groups and
projections representing the percentage allocation to the
asset group or class. In some examples, the asset group
vectoral similarity metric may use a cosine similarity
expressed by:

Asset Group Vectoral Similarity Score =

$$\cos(\theta) = \frac{Y \cdot Y}{\|X\|\|Y\|} = \frac{\sum_{i=1}^{n} X_i Y_i}{\sqrt{\sum_{i=1}^{n} X_i^2}\sqrt{\sum_{i=1}^{n} Y_i^2}},$$

wherein i is the ith asset group or class, n is the total
number of asset groups of the time series data, $X_i$ is the
allocation percentage of the $i^{th}$ asset class or group for
the first traded asset (x), and $Y_i$ is the allocation
percentage of the $i^{th}$ asset class or group for the second
traded asset (y). For the example shown in FIG. 3, the
asset group vectoral similarity score may be 0.999.
However, it is noted that other pairs of traded assets
may have different asset group vectoral similarity
scores.

An asset group graphical similarity metric may determine
a graphical similarity score based on a distance between first
graphical representations associated with pairs of traded
assets. The asset group graphical similarity metric may be
referred to as an asset group graphical similarity score. For
example, the process 200 may generate a graph in which a
set of traded assets are represented as nodes of the graph and
edges between nodes of the graph have a size metric
representing the similarity of allocations by asset group. In
an aspect, the set of nodes represented by the graph may
include all traded assets. In additional or alternative aspects,
the nodes represented by the graph may include a subset of
all traded assets. The graph may be used to find a closest
neighbour node. For example, the asset group graphical
similarity score may be determined by an equation:

Asset Group Graphical Similarity Score =

$$s(a, b) = \frac{C}{|I(a)||I(b)|}\sum_{i=1}^{|I(a)|}\sum_{j=1}^{|I(b)|} s(I_i(a), I_j(b)),$$

wherein I(a) is the first time series data for the first traded
asset (a), I(b) is the second time series data for the
second traded asset (b), i is a time instant for the first
time series data, j is a time instant for the second traded asset based on the second time series data, and C is a constant between 0 and 1. In some examples with the first and second time series data in FIG. 3, the asset group graphical similarity score between the first and second time series data may be 0.6.

At step 230, the process 200 may determine the relationships between traded assets based on one or more of the metrics described above, an ensemble of a combination of the above-described metrics, or other metrics. As a non-limiting example, the process 200 may determine a correlation or an ensemble similarity score between the traded assets 310, 320 based on the time series data 312 and the time series data 322, and potentially other information associated with the traded assets 310, 320, such as information regarding the traded assets in a fund, percentage allocations of asset groups within a fund, and the like) using one or more of the metrics described above. In some examples, the process 200 may determine a weighted sum of the metrics to determine a correlation between traded assets using the above-described metrics. For example, an example equation to determine the ensemble similarity score may be:

$$\text{Ensemble Similarity Score} = \text{Correlation Score}*W_1 - \text{Absolute Difference Score}*W_2 + \text{Asset Group Vectoral Similarity Score}*W_3 + \text{Asset Group Graphical Similarity Score}*W_4,$$

wherein $W_1$ is a first weight for the correlation score, $W_2$ a second weight for the absolute difference score, $W_3$ is a third weight for the asset group vectoral similarity score, and $W_4$ is a fourth weight for the asset group graphical similarity score. The four weights may be the same of different. For example, the first weight ($W_1$), the second weight ($W_2$), the third weight ($W_3$), the fourth weight ($W_4$) may be 300, 200, 100, and 50, respectively. The relationships determined using one or more of the above-described metrics may be used to identify traded asset pairs, which are two traded assets that exhibit similar behaviors over time.

At step 240, the process 200 may identify traded asset pairs. In an aspect, identified traded asset pairs may be validated to produce final traded asset pairs. The process 200 may identify traded asset pairs based on relationship information determined between different pairs of traded assets. For example, the process 200 may be used to evaluate all or a subset of traded assets to determine relationship information with respect to different pairs of traded assets, where the traded asset pairs are identified based on a strength of the relationships between two traded assets. In some examples, the relationship strength may be determined based on the above-described metrics or an ensemble or combination of those metrics. Each identified traded asset pair may include two traded assets, which may be referred to as a first traded asset and a second traded asset. In such examples, a traded asset may be associated with one or more traded asset pairs, where the traded asset is a first traded asset of each traded asset pair and the second traded asset for each traded asset pair is different. For example, let traded assets be designated as $TA_i$, where i represents a number of traded assets considered during traded asset pair identification, and traded asset pairs be denoted as $TAP_n$, where n is the number of traded asset pairs associated with a first traded asset $TA_1$. After traded pair identification the first traded asset $TA_1$ may be associated with 3 traded asset pairs (i.e., n=3), which may be designated as $(TA_1, TA_2)$, $(TA_1, TA_4)$, and $(TA_1, TA_7)$. As another example, only 1 traded asset pair may be identified for traded asset $TA_3$ (e.g., $(TA_3, TA_4)$). Accordingly, it should be understood that during traded asset pair relationships information may be determined a plurality of traded assets and that each traded asset may be identified as belonging to zero or more traded asset pairs based on the relationship information.

In an aspect, the process 200 may prune or reduce the traded asset pairs following an initial traded asset pair identification process. For example, the process 200 may limit the number of traded asset pairs with respect to a particular traded asset to a threshold number of traded asset pairs (e.g., 2 traded asset pairs, 3 traded asset pairs, 5 traded asset pairs, 10 traded asset pairs, or another suitable number). In an aspect, the reduced set of traded asset pairs may be determined based on the strength of the relationship information, with stronger relationships being retained and weaker relationships being discarded. The strength of the relationship between two traded assets may be determined based on the above-described metrics. For example, higher values of the correlation metrics, ensemble metrics, or combinations of the above-described metrics may indicate stronger relationships and lower values may indicate lower strength relationships. To illustrate and using the example of $TA_1$ above, the process 200 may be configured to limit the number of traded asset pairs for each traded asset to 2 traded asset pairs (e.g., the threshold number of traded asset pairs per traded asset may be 2). In the example above, the final traded asset pairs may only include traded asset pairs ($TA_1$, $TA_2$) and ($TA_1$, $TA_4$), with traded asset pair ($TA_1$, $TA_7$) being pruned because ($TA_1$, $TA_7$) has a lower relationship strength than ($TA_i$, $TA_2$) and ($TA_1$, $TA_4$). In an additional or alternative example, the process 200 may be configured to prune or reduce the final set of traded asset pairs based on strength of relationship only, rather than limiting to a particular number of traded asset pairs per traded asset. For example, a threshold strength of relationship may be configured for pruning traded asset pairs, where traded asset pairs having less than the threshold strength of relationship may be eliminated from the final list of traded asset pairs. As another non-limiting example, a combination of the above-described traded asset pair pruning techniques may be used, to limit the number of traded asset pairs by strength of relationship first and then pruning lower strength of relationship traded asset pairs to achieve a threshold or maximum number of traded asset pairs (if needed). It is noted that in some aspects, at least 1 traded asset pair may be identified for each traded asset. In such aspects, it may be that the only traded asset pair identified for a particular traded asset may not have a threshold strength of relationship but may be identified and retained in the final set of traded asset pairs to ensure that each traded asset has at least one traded asset pair that may be used for anomaly detection, as described in more detail below.

In an aspect, process 202 may be performed periodically to identify a (final) set of traded asset pairs. For example, process 202 may be performed prior to a start of each trading day to identify traded asset pairs that may be used to detect anomalous behaviors after trading begins and throughout the trading day. By determining traded asset pairs periodically, changes to the allocations and makeup of traded assets, such as mutual funds and ETFs that may change the traded assets making up the fund over time, may be accounted for and considered during traded asset pair identification, which may improve the accuracy of the anomaly detection techniques described in more detail below. Reducing or pruning the set of traded asset pairs using the techniques described above reduces the memory requirements of a system operating in accordance with aspects of the present disclosure and the computing resources (e.g., reduces processor computational resources) required for performing anomaly detection using the techniques described herein. Also, limiting the set of identified traded asset pairs to traded asset pairs satisfying a threshold strength of relationship may reduce the number of false positive anomaly detections, resulting in higher accuracy and increased confidence that anomalous behaviors detected using the techniques described herein are true anomalies.

As briefly described above, the traded asset pairs identified using the above-described techniques may be used to identify anomalies and divergent behaviors of traded assets on a given trading day. The detection of anomalies and divergent behaviors based on traded assets may be performed using information extracted from a data stream, which may be a real-time data stream. The data stream may be received, at step 250, and include information associated with traded assets corresponding to the traded assets included in the set of traded asset pairs. It is noted that in some aspects multiple data streams may be utilized, such as data streams coming from different data sources. As a non-limiting example, the traded asset pairs may include traded assets traded on different exchanges and data streams may be received from each of the different exchanges to perform anomaly detection. As described in more detail below, one type of information that may be extracted from the received data stream(s) at step 250 for use in performing anomaly detection is trading price (e.g., the current price of traded assets being sold and purchased on an exchange). It is noted that other types of data could be included in the data streams obtained from the data source(s) and used for anomaly detection, such as transaction detail data, which may include asset component hierarchy data, asset identifier data, or other types of asset data.

At step 260, the received data streams may be monitored using the information extracted therefrom to perform anomaly detection. During the monitoring changes in attributes for each traded asset associated with one of the traded asset pairs may be identified and the changes may be used to detect anomalies or divergent behaviors with respect to traded assets based on the traded asset pairs. As a non-limiting example, current price data may be extracted from the received data stream and used to detect changes or movements in the prices of traded assets. The changes or movements in the prices of traded assets included in each traded pair may be evaluated to detect whether the traded assets making up a traded asset pair are moving asynchronously. To illustrate, traded asset pair (TA$_1$, TA$_2$) may exhibit behaviors such that on a given day or over a given period of time (e.g., a period of hours, days, weeks, months, etc.) TA$_1$ and TA$_2$ exhibit similar price fluctuations, such as an approximate 5% increase or decrease in price. If the price information extracted from the data stream(s) indicates that TA$_1$ is exhibiting a different behavior than TA$_2$ then an anomaly may be detected. For example, suppose that TA$_1$ is determined to be exhibiting a behavior of increasing price while TA$_2$ is determined to be exhibiting a decrease in price based on the price data extracted from the data streams. If such divergent behavior is detected then an anomaly may be identified. As another example, suppose that TA$_1$ exhibits a first price movement up/down and TA$_2$ exhibits a second price movement up/down. While the price movements exhibited by TA$_1$ and TA$_2$ may both be in the same direction, whether up or down in price, an anomalous behavior may be detected if TA$_1$ exhibits a greater movement than the price movement exhibited by TA$_2$. For example, suppose that TA$_1$ moves 14% and TA$_2$ only moves 1.4%. In such an instance, even though the price movements for both TA$_1$ and TA$_2$ are in a same direction, the disparity between the two price movements may also be used to detect anomalous behavior (e.g., because traded asset pairs are identified based on the traded assets of the traded asset pair exhibiting similar behaviors). In an aspect, one or more thresholds may be configured to trigger detection of anomalous behaviors. For example, if the price movement difference as between two traded assets is greater than a threshold difference (e.g., 5%, 8%, 10%, 15%, 25%, 40%, or another value) as compared to normal price movement differences for the traded asset pair, an anomaly may be detected. So, for example, if price movements of TA$_1$ and TA$_2$ are different by 0-4% an anomaly may not be detected, but if the price movement is greater than or equal to 5% then an anomaly may be detected. It is noted that price movements in the examples above may refer to the price of individual traded assets, such as a stock, or net asset value for fund-type traded assets (e.g. mutual funds, ETFs, and the like).

In addition to the above-described techniques, the anomaly detection, at step 260, may be implemented with some controls to further reduce false positive anomaly detections. To illustrate, rather than just looking for a threshold difference in value, such as a difference of "x" basis points (bps) or "y" % difference, a threshold may be configured using a relative measure. For example, a standard error (SE) between traded assets of a traded asset pair may be calculated and an anomaly may be detected when the difference is greater than or equal to a multiple of the standard error (e.g., 2×SE, 2.5×SE, between 2-5×SE, and the like). As another example, for a given set of traded assets pairs, one of the traded assets associated with the set of traded asset pairs may be designated as a master traded asset and the rest of the similar traded assets may be determined to be sister traded assets. The master traded asset may be detected to exhibit an anomaly only if some of the sister traded assets also exhibit anomalies. In an aspect, the master traded asset may be detected to exhibit an anomaly only if a majority of the sister traded assets exhibit anomalies. It is noted that the master traded asset may be a traded asset that is associated with multiple traded asset pairs, such as in the above-described example where traded asset TA$_1$ was associated with traded asset pairs (TA$_1$, TA$_2$), (TA$_1$, TA$_4$), and (TA$_1$, TA$_7$). In such a scenario, TA$_1$ may be the master traded asset and an anomaly may be detected for TA$_1$ with respect one of traded assets in the traded asset pairs of TA$_1$ (e.g., TA$_2$, TA$_4$, and TA$_7$), and then validated as a true anomaly if anomalies are detected as between TA$_1$ and other ones of TA$_2$, TA$_4$, and TA$_7$. Validating detected anomalies using the behavior of the master traded asset relative to other traded assets in traded asset pairs with the master traded asset may improve the accuracy of anomaly detection processes described herein and reduce the number of false positive anomalies detected.

It is noted that in some instances master traded assets and sister traded assets may not require all traded asset pairs have a common traded asset (e.g., TA$_1$ in the example above). For example, suppose the identified traded asset pairs include (TA$_1$, TA$_2$), (TA$_1$, TA$_4$), (TA$_1$, TA$_7$), (TA$_2$, TA$_5$), (TA$_3$, TA$_4$), (TA$_5$, TA$_6$), and (TA$_6$, TA$_7$). Traded asset TA$_3$ is only identified in one traded asset pair (TA$_3$, TA$_4$). In such instances it may not be possible to use the above-described technique in which one traded asset is designated as the master traded asset and other traded assets identified in traded asset pairs with the master traded asset are sister traded assets. However, TA$_3$ may be in a same asset group or class as other ones of TA$_1$, TA$_2$, and TA$_5$ 4-7. In such instances, TA$_3$ may be designated as a master traded asset and sister traded assets may be identified based on other traded assets that are within the same asset group or class as $TA_3$, thereby providing additional reference data that may be used to validate detection of an anomaly with respect to $TA_3$ despite only one traded asset pair being identified for $TA_3$. By creating traded asset pairs for each traded asset and determining, for each traded asset, a master traded asset and sister traded assets, anomaly detection may be more accurate and reliable and the number of falsely detected anomalies may be reduced.

When anomalies are detected, at step 260 of the process 200, a control signal may be generated (e.g., by the one or more processors 112 of FIG. 1 or the anomaly detection engine 120 of FIG. 1). The control signal may be configured to initiate detection of a cause of the detected anomaly. The control signal may include a certain voltage level, a certain current level, a wired or wireless signal, or any another suitable signal that may be used to indicate an anomaly has been detected. In an aspect, the control signal may be used to control a user interface to display information associated with the detected anomaly. For example, the user interface may be displayed at a computing device (e.g., the computing device 150 of FIG. 1) associated with an analyst who may investigate the detected anomaly to determine the cause or reason the anomaly has occurred, as well as confirm the anomaly is in fact an anomaly. In an additional or alternative aspect, automated causation processes may be initiated in response to the control signal. For example, the automated causation processes may receive the control signal, which may contain information associated with the anomaly, and may execute one or more causation rules to determine the cause of or confirm the occurrence of the anomaly.

As a non-limiting example, suppose that a traded asset experiences a sudden price increase or decrease that is detected as an anomaly because other traded assets (e.g., traded assets identified as traded asset pairs with the traded asset or identified as sister traded assets to the traded asset) do not exhibit a similar behavior (e.g., a magnitude of price change). The control signal may trigger display of information associated with the detected anomaly to a user interface of an analyst computing device, who may then investigate the anomaly to confirm the presence of the anomaly and determine the cause of the anomaly. The user interface may provide interactive tools and resources that may enable the analyst to perform investigative analysis of the anomaly. For example, the user interface may enable the analyst to search for news related to the traded asset corresponding to the anomaly. The news may provide information that may support confirmation of the anomaly, such as a press release indicating a product recall was announced or that a contract for a large purchase was finalized. Such information may have caused the anomalous behavior and therefore support the validity of the anomaly (e.g., the traded asset behaving abnormal relative to other assets in a traded pair with the anomalous traded asset or behaving differently with respect to sister traded assets). In other instances, the investigative tools may enable the analyst to view order information associated with the traded asset. For example, the order information may indicate that a large buy or sell order was placed and the analyst may review the order history to evaluate whether sudden change in price could have been a caused by that order. For example, a large buy order may have triggered a large number of sell orders, which may have sparked short-term buying interest or absorbed all of the liquidity within a certain price range (e.g., limit sell orders may have been filled rapidly leaving a large spread). Such situations may result in rapid fluctuations in price as the market reacts to news and trading activity on a given trading day, but such fluctuations may be short-lived, and prices may return to expected levels shortly after the abnormal behavior. In instances where the anomaly is detected with respect to such short-term activity the analyst may determine that the anomaly was present but may recommend no further action because the market corrected itself and the price behavior of the traded asset returned to expected levels shortly after the anomaly occurred. However, if the behavior does not appear to be short-term or is caused by other non-market conditions, such as an error at an exchange or trading being halted, the anomaly may be confirmed as present and one or more actions may be recommended to mitigate the impact of the anomaly.

As another non-limiting example, the control signal may cause execution of set of causation rules configured to verify price movement data associated with the traded asset over a period of time (e.g., one or more minutes, hours, days, weeks, etc.). Verification of the price movement data over the period of time may include validating price data across multiple data sources (e.g., multiple ones of the data sources 140 of FIG. 1). The causation rules may additionally or alternatively include rules for analyzing trading data for the traded asset to determine whether the price change behavior is the result of trading activity, as described above, news, or other factors. In an aspect, the validation may be configured to utilize multiple data sources to validate the price data to confirm that the price change data is valid and accurate, and not an error in data transmission or reception by the anomaly detection engine. If the price data is validated over the period of time by the causation rules, the anomaly may be confirmed as a true anomaly and information associated with a cause of the detected anomaly may be recorded to a database (e.g., the one or more databases 118 of FIG. 1).

Additionally, the causation rules may be configured to recommend one or more actions based on the determined cause of the anomaly. For example, where the anomaly is determined to be caused by trading activity and it is determined that the abnormal trading activity has ceased (i.e., behavior of the traded asset has returned to normal or expected behavior or within a threshold percentage of normal or expected behavior), the causation rules may generate an output that indicates short-term trading volume and/or activity was likely the cause of the anomaly and that no further action is likely required (e.g., because the abnormal behavior has subsided). However, where the causation rules determine that the cause of the anomaly is not short-term trading activity, such as an error occurring at a system of an exchange or fund manager, the causation rules may generate an output that indicates a technical malfunction of a third-party system may be the cause of the anomaly. The causation rules may also be configured to initiate or suggest initiation of one or more actions to mitigate an impact of the anomaly (e.g., halting trading, limiting orders to buy or sell only, redirecting trades to a particular system where the malfunction has not occurred, and the like). In an aspect, the causation rules may escalate the anomaly to a human analyst who may confirm or authorize execution of the one or more actions (e.g., halting trading, limiting orders to buy or sell only, redirecting trades to a particular system where the malfunction has not occurred, and the like). It is noted that the example actions to mitigate the impact of detected anomalies may be the same as or similar to remedial actions initiated by the analyst during manual investigation. Additionally, it is noted that the user interface and/or causation rules may provide functionality to analyze other metrics that may be used to detect anomalous behavior, such as information related to Trading Gain/Loss, Market Value, Dividend Income, Interest Income, Accretion/Amortization, Miscellaneous Income, Expenses, Variation Margin, Realized Currency Gain/Loss, Shareholder Activity, combinations thereof, or other types and combinations of information suitable for investigating anomalies occurring with respect to traded assets.

Using the techniques described above enables traded assets to be monitored for anomalies in real-time based on trading data monitored throughout a trading day. Because traded asset pairs are identified on a daily basis, the specific set of traded assets that may be used to detect anomalies may change over time, thereby ensuring that each traded asset has a set of traded asset pairs and/or sister traded assets that may be used to perform anomaly detection with a high level of confidence. Performing real-time detection of anomalies may also enable remedial actions to be performed more rapidly, within seconds (e.g., 30-90 seconds) or minutes (e.g., 2-5 minutes, 2-20 minutes, or another number of minutes) of detecting the anomaly. Initiating the action(s) to mitigate detected anomalies may reduce the impact of the detected anomalies. As an example, where an anomaly is detected and validated, the anomaly may be accounted for during other operations, such as when calculating a NAV of each traded asset at the conclusion of the trading day. Because anomalies can be detected, investigated, validated, and the impacts mitigated throughout the trading day, calculation of NAV may be performed more quickly, making it more likely that accurate NAV values are output by the deadline that is only a few hours after the end of each trading day. Compared to current techniques which require manual detection of anomalies at the conclusion of each trading day, NAV calculations performed in a system operating in accordance with the present disclosure may be provided in a timely manner. Additionally, the techniques described herein provide more accurate NAV calculations across a broad spectrum of traded assets associated with different asset classes or groups. The above-described features may also be utilized to monitor fund migrations between accounting systems as a reconciliation capability for operational compliance.

At step 270, information associated with detection and mitigation of anomalies may be used as feedback to train and improve traded pair identification process 202 and anomaly detection and control process 204. For example, information associated with the weights used to calculate one or more of the above-described metrics may be modified using information included in the feedback to produce optimized metric values and/or ensemble metric values that may more accurately identify traded asset pairs. In an aspect, the modifications to metric weights may be applied on a per traded asset basis (e.g., adjusting weights associated with traded asset pair identification for certain traded assets and not others), on a per traded asset group or class basis (e.g., adjusting weights associated with traded asset pair identification for certain traded asset groups or classes and not others), or both. Improving the processes used to perform identification of traded asset pairs may in turn result in more accurate detection of anomalies and/or eliminate false positive detections of anomalies. The feedback may also be used to create new tools and/or rules for investigating or determining causes of anomalies, as well as determine improved actions that may be taken to mitigate anomalies that are detected using the techniques described herein. For example, an initial set of rules may be provided but may not detect causes of certain types of anomalous behaviors. In such instances the causation rules may be configured to escalate an anomaly to an analyst when causation rules are unable to detect or determine a cause of the anomaly. The analyst may then investigate the anomaly as described above. The feedback may include information associated with the detected anomaly, the investigative techniques applied by the analyst to verify the anomaly, or other types of information (e.g., data sources used to investigate the anomaly, identified causes of the anomaly, information indicating the anomaly was valid or false positive, etc.), or combinations thereof. Such information may then be used to design new causation rules that enable causes of new anomalies that were previously undetectable by the causation rule set to be automatically diagnosed and investigated. In this manner, more and more anomalies may be detected and validated in an automated manner, further supporting automation and scaling of the anomaly detection techniques disclosed herein.

As shown above, the process 200 provides a framework for identifying anomalous trading behavior for traded assets with improved accuracy and scalability, which may be particularly important as the number of traded assets, such as mutual funds and ETFs continues to grow, resulting in tens of thousands of traded assets that require monitoring for anomalous behaviors and which are impractical to monitor manually due to the large volume of traded assets, the complexities associated with detection and verification, as well as the speed at which such processes need to be performed to enable post-trading data processes to be completed in a manner that accounts for any detected anomalies shortly after the conclusion of the trading day (e.g., within 2 hours, 2.5 hours, or 3 hours). Additionally, the disclosed anomaly detection framework may operate on real-time data streams associated with trading activity to detect anomalies as they occur or shortly thereafter, as well as validate the occurrence of anomalies to confirm behaviors detected as potential anomalies are in fact anomalies, thereby ensuring that all or a majority of anomalies are detected and investigated prior to performing post-trading processes that need to account for the impact of anomalies that have been detected.

As a non-limiting and illustrative example, the above-described anomaly detection techniques may support exception analytics. During exception analytics, an accountant may clear exceptions (e.g., after system clear exceptions have been processed). Both systemic and manually cleared exceptions may be collected and made available through one or more dashboards that enable analysts to interrogate the data grouped by accounting systems, clients, funds, accounting dates, and the like to identify opportunities for efficiency. As another example, NAV service level agreement (SLA) drift analysis may be supported using anomaly detection techniques described herein. To illustrate, fund accounting workflows may be broadly organized into transaction, valuation and final lock states. NAV dissemination occurs on the final step (e.g., final lock). Each step of the workflow may be collected and made available through one or more dashboards and users can review the data grouped by accounting systems, clients, funds, accounting dates, and the like. These dashboards provide users the ability to identify functional lag or drifts and potentially help bring focus to clients and fund groups early in the day, that are tending to miss SLAs. Having improved visibility into anomalies enables the above-described workflows to be performed earlier and more quickly, enabling certain workflow tasks to be completed more quickly, such as the final locks step. Further illustrative aspects of the of the process 200 and the functionality performed by the computing device 110 and anomaly detection engine 120 of FIG. 1 are described in more detail below with reference to FIGS. 4-9.

Figures 4, 5:
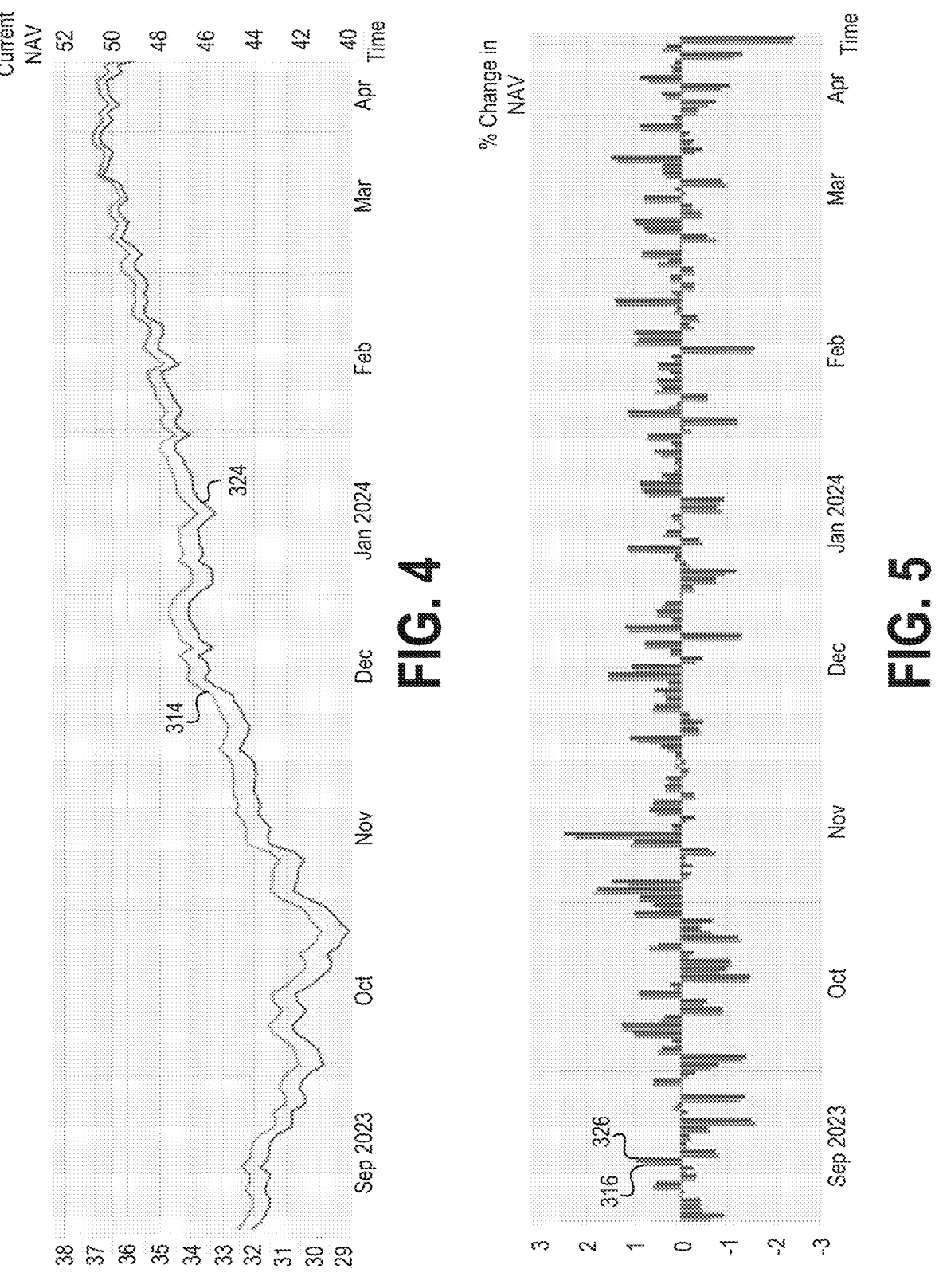
FIG. 4 shows an example traded asset pair of two time series data sets corresponding to two traded assets in accordance with aspects of the present disclosure.
FIG. 5 shows an example traded asset pair of two time series data sets corresponding to two traded assets in accordance with aspects of the present disclosure.

Referring to FIG. 4, a diagram illustrating example time series data for two traded assets in accordance with aspects of the present disclosure. In the example of FIG. 4, the time series data 314, 324 of FIG. 3 are shown. As explained above, the time series data 314 corresponds to the traded asset 310 and the time series data 324 corresponds to the traded asset 320. As briefly explained above, the process 200 may identify a traded asset pair that includes the traded asset 310 and the traded asset 320 based on the time series data 314 and the time series data 324. Although the absolute NAVs represented by the time series data 314 and the time series data 324 are different (i.e., represent different actual NAVs over time). However, it can be observed that the behavior (e.g., movements, changes of the NAV, etc.) for the traded assets 310, 320 are relatively synchronous (e.g., make similar movements up and down) over time. To illustrate, for a given time period movements in the NAV of the traded asset 310, as represented by the time series data 314, exhibit similar behaviors to the NAV of the traded asset 320, as represented by the time series data 324. Such movements may be not only similar in direction (e.g., NAV is increasing or decreasing), but may also be similar in magnitude (e.g., exhibit a similar percentage change in NAV over the time period). As explained above, the various metrics and analytics described above with reference to FIGS. 1 and 2 may be utilized to characterize and/or evaluate the behavior of the traded assets 310, 320 (e.g., at steps 220, 230 of the process 200). The metrics indicative of the behavior of the traded assets 310, 320 (e.g., the metrics determined at steps 220, 230 of the process 200) may be used to determine a degree of similarity for the traded assets 310, 320. If the behavioral similarity of the traded assets 310, 320 satisfies a threshold similarity or other criterion, the traded assets 310, 320 may be identified as a traded asset pair (e.g., at step 240 of the process 200).

It is noted that the time series data shown in FIG. 4 is provided by way of illustration, rather than by way of limitation and that other types of time series data may be utilized to evaluate the behavior of traded assets during traded asset pair identification in accordance with the concepts described herein. For example, FIG. 5 shows additional time series data for two traded assets in accordance with aspects of the present disclosure. In contrast to the time series of FIG. 4, the time series data shown in FIG. 5 includes time series data 316 and time series data 326, representing a percent change in NAV for the traded assets 310, 320, respectively. As explained above with reference to FIG. 4, the percentage change in NAV for two traded assets may be used to evaluate a magnitude of similarity for behaviors exhibited by two traded assets. For example, it may be possible that two traded assets exhibit similar directional movement-type behaviors over time, but the magnitude of the behavior of one of the traded assets may be greater than the other, which may signify that the two traded assets are not ideal candidates to be identified as a traded asset pair. This is because it may be difficult to evaluate or determine whether a particular move of the more volatile traded asset is the result of an anomaly or is merely a normal behavior for the more volatile traded asset. Accordingly, looking at the percentage change in NAV (or similar metrics and characteristics) over time may provide a more accurate indication that two traded assets are similar enough to be identified as a traded asset pair. That is to say, when the change over a given period of time is approximately similar for the two traded assets, an anomaly may be detected when one of the traded assets exhibits a stronger behavior (e.g., greater percentage change in NAV) as compared to the other traded asset in a traded asset pair. It is to be appreciated that combinations of the characteristics and behaviors shown in FIGS. 4 and 5 may be used for anomaly detection, such as to ensure that traded assets in a traded asset pair exhibit both similar behaviors (e.g., movements in similar directions over time) as well as magnitude of behavior (e.g., movements of a same relative strength, such as a change in percentage change in NAV over a time period of between x %-y %).

As can be appreciated from the foregoing, utilizing the various metrics described herein may enable accurate identification of two traded assets exhibiting similar behavioral characteristics, which may be used to create a traded asset pair. The traded asset pairs identified using the concepts described herein provide both a data point and reference point, such that each traded asset in a traded asset pair may be used as a data point that may be compared to reference data associated with the other traded asset of the traded asset pair. As described above, identifying multiple traded asset pairs may provide more reference data, which can be leveraged to validate anomalies prior to generating the control signal in some implementations. While utilizing multiple traded asset pairs to verify or validate anomaly detection, it is possible that a large number of traded asset pairs are identified for some traded assets. For example, using the metrics described above a single traded asset may be associated with 100 traded asset pairs (101 total traded assets). Some of the traded asset pairs may have a weak correlation (e.g., the behavioral characteristics of those traded asset pairs are not within a desired degree or magnitude of similarity) based on one or more of the above-described metrics used in the process 200. Accordingly, the traded asset pairs may be determined and then a final set of traded asset pairs may be generated by eliminating those traded asset pairs that do not provide a threshold similarity (e.g., based on the calculated metric(s)). This may reduce the computational resource utilized during monitoring by eliminating the use of computing resources to monitor evaluate whether an anomaly is occurring with respect to a particular traded asset using behaviors of other traded assets exhibiting low behavioral similarity to the behavior of the particular traded asset.

Figure 6:
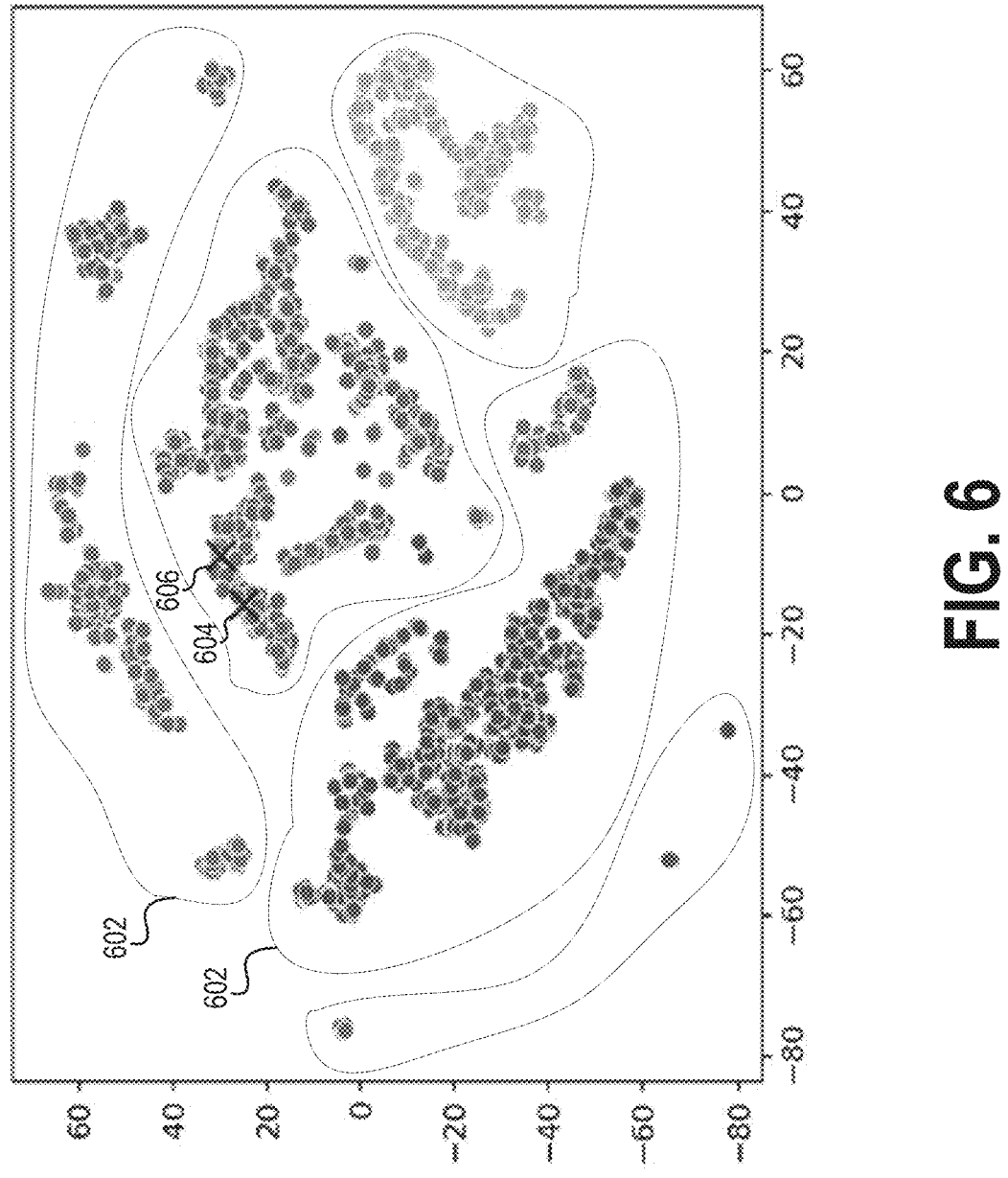
FIG. 6 shows an example cluster-based validation metric in accordance with aspects of the present disclosure.

Referring to FIG. 6, a diagram illustrating an example cluster-based process for validating traded asset pairs in accordance with aspects of the present disclosure. In an aspect, the cluster-based process shown in FIG. 6 may be used by the process 200 to validate the traded asset pairs determined at step 240. For example, the process 200 may apply a clustering algorithm to the traded assets to organize them into one or more clusters based on the one or more validation metrics. Traded asset pairs may then be determined to be valid or invalid based on whether each traded asset pair of the traded asset pairs is included in a same cluster of the one or more clusters. As a non-limiting example, FIG. 6, the traded assets are organized into several clusters 602 based on the one or more validation metrics. For example, the clustering algorithm may receive input information (e.g., similarity scores, NAVs, prior NAVs, absolute difference scores, asset groups, asset group values, and/or any other suitable information) associated with the traded assets and execution of the clustering algorithm may produce the various clusters 602 shown in FIG. 6. In FIG. 6, the x-axis and y-axis are coordinates generated using principal component analysis (PCA) techniques configured to transform features of the data sets associated with the traded assets to coordinates represented by the X and Y axes, respectively. Traded assets in the same cluster may have a similar movement or change pattern in time series data or have same or similar attributes (e.g., asset groups). To illustrate, a traded asset 604 and a traded asset 606 may be assigned by the clustering algorithm to the same cluster 602. The process 200 may validate the traded asset pair corresponding to the traded asset 604 and the traded asset 606 based on the two traded assets belonging to the same cluster. In an aspect, the clustering algorithm may be a k-means clustering algorithm, a DBSCAN algorithm, or another suitable clustering algorithm. Where a traded asset pair is determined to be invalid, the traded asset pair may be omitted from a final set of traded asset pairs, while valid traded asset pairs may be included in the final set of traded asset pairs used for anomaly detection.

Figures 7, 8:
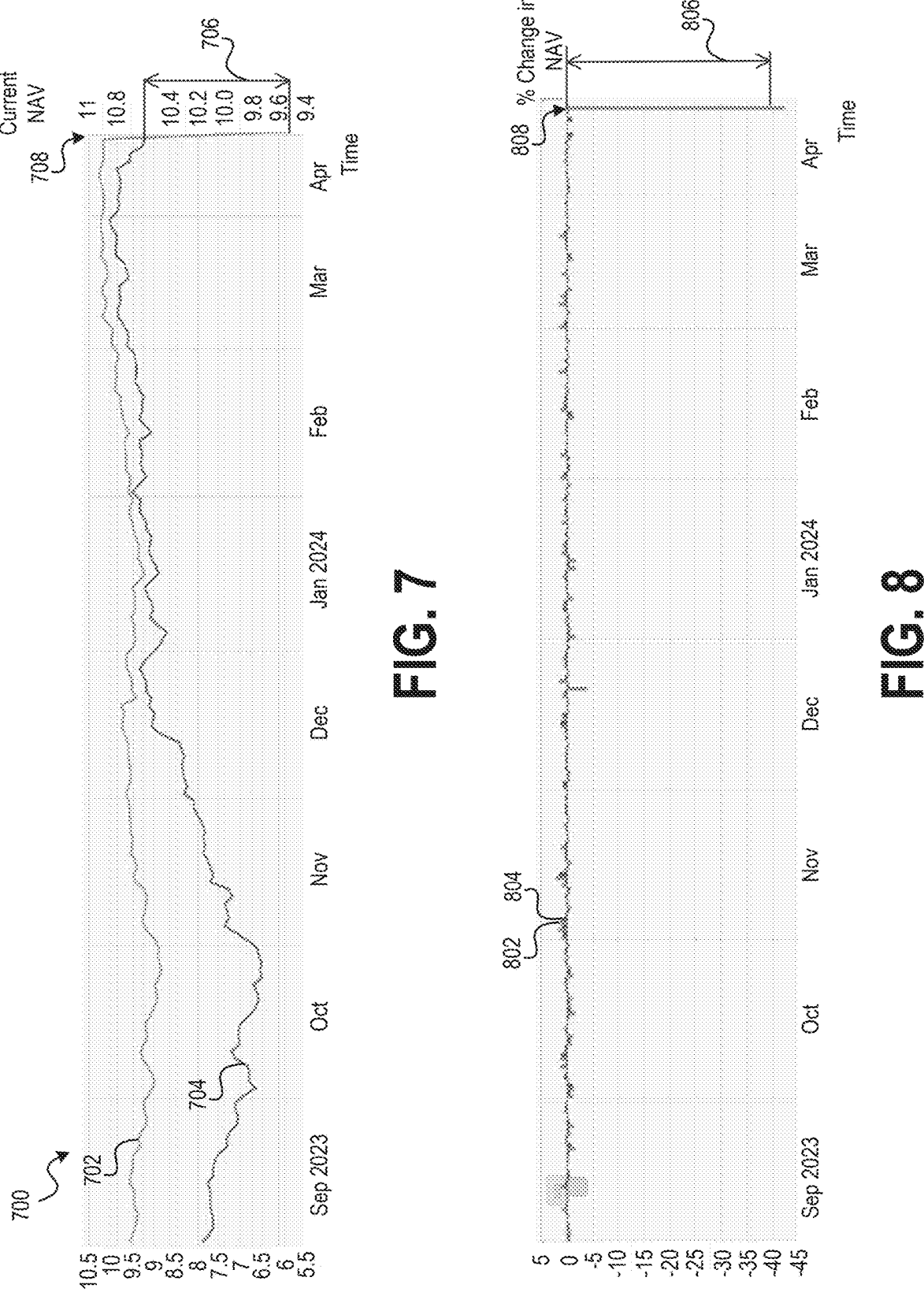
FIG. 7 shows a real-time data stream of a traded asset pair and an anomaly in the traded asset pair accordance with aspects of the present disclosure.
FIG. 8 shows a real-time data stream of a traded asset pair and an anomaly in the traded asset pair accordance with aspects of the present disclosure.

Referring to FIGS. 7 and 8, example operations for performing anomaly detection in accordance with aspects of the present disclosure are shown. As explained above, anomaly detection may be performed using a real-time data stream, which may include all or a portion of time series data 702 associated with a first traded asset and the time series data 704 associated with a second traded asset, where the first and second traded assets corresponding to the time series data 702, 704 are identified as a traded asset pair. In FIG. 7, the time series data 702, 704 include NAVs. In an aspect, rather than operating on time series data over a long period of time, as shown in FIG. 7, anomaly detection processes may be performed using data obtained during a trading day or a some other time period (e.g., a past 3 days, a past week, a past month, a number of months, or other suitable time frame). In some examples, the process 200 of FIG. 2 may normalize NAVs of the time series data 702, 704. For example, the time series data 702, 704 may be converted using the same or different scales to easily compare the different time series to each other. In some scenarios, one of the time series data may have a sudden drop or spike such that the difference 706 between the time series data 702, 704 at a certain time 708 is larger than a threshold. In such scenarios, the processor determine that an anomaly occurs in the traded asset pair.

In FIG. 8 data of a real-time data stream 800 including information associated with the traded assets of the traded asset pair of FIG. 7 are shown. The real-time data stream 800 may include time series data 802 associated with the first traded asset and the time series data 804 associated with the second traded asset of the traded asset pair. In FIG. 8, the time series data 802, 804 include data representing percentage changes of NAVs for the first and second traded assets. In the example scenario of FIGS. 7 and 8, one of the traded assets experiences a sudden spike (e.g., a drop or increase) in percentage change in NAV such that a difference 806 between the percentage changes of NAVs at a certain time 808 is larger than a threshold. Upon detection of the spike, an anomaly may be detected with respect to one of the traded assets in the traded asset pair (e.g., the traded asset experiencing the sudden spike). As explained above, the changes illustrated in FIGS. 7 and 8 may be indicative of an anomaly with respect to a traded asset. However, it should be understood that other traded assets in traded asset pairs with the anomalous traded asset (e.g., the traded asset exhibiting the spike) may be evaluated to confirm the anomaly's presence in some implementations, as described above.

Referring to FIG. 9, a flow diagram for an example process to automatically and dynamically detect anomalies in traded assets in accordance with aspects of the present disclosure is shown. It is noted that the steps or operations described with reference to FIG. 9 are meant to further illustrate aspects of the functionality provided by the one or more anomaly detection engines 120 of FIG. 1. Thus, it is to be understood that the functionality described below with reference to FIG. 2 may be provided by the device 110, the one or more processor 112, the memory 114, and/or the one or more anomaly detection engines 120 illustrated in FIG. 1. The steps or operations of the method 900 may be stored as instructions (e.g., the instructions 116 and/or the one or more anomaly detection engines 120 of FIG. 1) that, when executed by one or more processors (e.g., the one or more processors 112 and/or the one or more anomaly detection engines 120 of FIG. 1), cause the one or more processors to perform the steps of the method 900. It should be understood that the method 900 may be configured to perform various ones of the operations described above with reference to FIGS. 1-8 to perform anomaly detection in accordance with aspects of the present disclosure.

At block 910, the method 900 includes receiving, by one or more processors, a data set corresponding to a plurality of traded assets. As explained above, the plurality of traded assets may include a first traded asset and a second a second traded asset. In some implementations, the plurality of traded assets may include thousands of traded assets, tens of thousands of traded assets, one hundred thousand traded assets, or more. The data set includes time series data associated with each of the plurality of traded assets. For example, the data set includes first time series data associated with the first traded asset and second time series data associated with the second traded asset. In an aspect, the data set may be received from one or more data sources (e.g., the one or more data sources 140 of FIG. 1), as explained above. The data set may be normalized or subjected to other data processing to conform the data set to a common format (e.g., when portions of the data set are different formats due to being received from different internal and/or external systems).

At step 920, the method 900 includes determining, by the one or more processors, relationship information between pairs of traded assets of the plurality of traded assets based on at least a portion of the data set. As explained above, the relationship information may include information corresponding to a relationship between the first traded asset and the second traded asset determined based on the first time series data and the second time series data. For example, the relationship information may be determined as described above with reference to FIGS. 1-8 and the process 200. At step 930, the method 900 includes identifying, by the one or more processors, a set of traded asset pairs based on the relationship information. At step 940, the method 900 includes validating, by the one or more processors, the set of traded asset pairs based on one or more validation metrics. In an aspect, the identification of a set of traded asset pairs and validation of the traded asset pairs may be performed as described above with reference to FIGS. 1-8 and the process 200 of FIG. 2. It is noted that steps 930 and 940 may include additional operations described herein to optimize and reduce the set of traded asset pairs, as described herein.

At step 950, the method 900 includes monitoring, by the one or more processors, a real-time data stream comprising information associated with the traded asset pairs to determine real-time changes in attributes for each traded asset of the set of traded asset pairs. As a non-limiting example, the attributes may include a current and historical NAV of each monitored traded asset, a percentage change of NAV, or other characteristics and attributes of traded assets described herein or apparent to one of ordinary skill in the art based on the concepts disclosed herein. At step 960, the method 900 includes detecting, by the one or more processors, an anomaly associated with a first traded asset pair based on the monitoring. In an aspect, the detection of anomalies may be performed in real-time (e.g., as the anomalies occur or reach a threshold level of divergent or abnormal behavior). At step 970, the method 900 includes generating, by the one or more processors, a control signal configured to initiate detection of a cause of the anomaly associated with the first traded asset pair in response to detecting the anomaly. In an aspect, steps 950, 960, 970 may include various operations described in the similar portions of the process 200 of FIG. 2 and the operations described herein with reference to FIGS. 1-8. Additionally, the method 900 may include other operations described herein, such as generating feedback data that may be used to refine and improve traded asset pair identification processes, anomaly detection processes, and anomaly mitigation processes performed in response to the control signal generated at step 970.

As can be appreciated from the foregoing, the method 900 may be used to determine relationship information for identifying traded assets exhibiting similar behavioral characteristics or attributes. The behavioral characteristics or attributes may be determined using one or more of the metrics described herein and the relationship information may be used to identify traded asset pairs. The traded asset pairs identified using the concepts described herein provide both a data point and reference point, such that each traded asset in a traded asset pair may be used as a data point that may be compared to reference data associated with the other traded asset of the traded asset pair, which may enable identification of traded assets that exhibit anomalous behaviors (e.g., behaviors that deviate from the behaviors of the other traded assets identified in traded asset pairs with the traded asset). The control generated in response to detection of anomalies may enable verification and/or confirmation of anomalies, as well as initiation of actions to mitigate the anomalies, in a more timely manner, thereby reducing the overall impact of anomalies. The method 900 may also utilize feedback learning to improve one or more steps of the method, thereby continually improving performance of the system, accuracy with respect to traded pair identification and anomaly detection, and mitigation of anomaly impacts over time.

Clause 1: A method for anomaly data detection is disclosed and includes: receiving, by one or more processors, a data set corresponding to a plurality of assets, wherein the plurality of assets comprises a first asset and a second asset, and wherein the data set comprises first time series data associated with the first asset and second time series data associated with the second asset; determining, by the one or more processors, relationship information between pairs of assets of the plurality of assets based on at least a portion of the data set, wherein the relationship information comprises information corresponding to a relationship between the first asset and the second asset determined based on the first time series data and the second time series data; identifying, by the one or more processors, a set of asset pairs based on the relationship information; validating, by the one or more processors, the set of asset pairs based on one or more validation metrics; monitoring, by the one or more processors, a data stream comprising information associated with the asset pairs to determine real-time changes in attributes for each asset of the set of asset pairs; detecting, by the one or more processors, an anomaly associated with a first asset pair based on the monitoring; and in response to detecting the anomaly, generating, by the one or more processors, a control signal configured to initiate detection of a cause of the anomaly associated with the first asset pair.

Clause 2: The method of clause 1, wherein determining the relationship information includes: determining, by the one or more processors, one or more similarity metrics between the first time series data and the second time series data; and determining, by the one or more processors, a correlation between the first asset and the second asset based on a weighted sum of the one or more similarity metrics.

Clause 3: The method of clause 2, further comprising: adjusting, by the one or more processors, weights associated with the plurality of similarity metrics based on feedback data.

Clause 4: The method of clause 2, wherein the data set comprises information corresponding to a plurality of asset groups, wherein the one or more similarity metrics comprise two or more metrics selected from the list consisting of: a first metric determined based on a ratio of covariance between the first time series data and the second time series data; a second metric determined based on a difference between asset group allocations associated with the first asset and the second asset; a third metric determined based on vector representations of asset groups of the first asset and the second asset; and a fourth metric determined based on a graphical representation of the plurality of assets.

Clause 5: The method of clause 1, wherein validating the asset pairs comprises: clustering, by the one or more processors, the plurality of assets into one or more clusters; and validating, by the one or more processors, the asset pairs based on whether both assets of each asset pair of the asset pairs are included in a same cluster of the one or more clusters.

Clause 6: The method of clause 1, wherein the detecting of the anomaly comprises: determining, by the one or more processors, a difference between a behavior of the first asset relative to a behavior of the second asset; and detecting, by the one or more processors, the anomaly when the difference in behavior satisfies an anomaly detection criterion.

Clause 7: The method of clause 6, wherein the anomaly detection criterion is a threshold difference.

Clause 8: The method of clause 1, further comprising: reducing, by the one or more processors, the identified asset pairs to produce a reduced set of asset pairs, wherein the monitoring is performed based on the reduced set of asset pairs.

Clause 9: The method of clause 1, wherein the detecting of the anomaly comprises: identifying, by the one or more processors, a master asset and one or more sister assets corresponding to the master asset; and validating, by the one or more processors, a presence of the anomaly when the anomaly is detected with respect to the master asset and one or more of the sister assets.

Clause 10: The method of clause 1, wherein the plurality of assets comprise a plurality of traded assets or a plurality of network elements.

Clause 11: A non-transitory computer-readable medium storing instructions that, when executed by one or more processors, cause the one or more processors to perform operations for anomaly data detection, the operations comprising: receiving a data set corresponding to a plurality of assets, wherein the plurality of assets comprises a first asset and a second asset, and wherein the data set comprises first time series data associated with the first asset and second time series data associated with the second asset; determining relationship information between pairs of assets of the plurality of assets based on at least a portion of the data set, wherein the relationship information comprises information corresponding to a relationship between the first asset and the second asset determined based on the first time series data and the second time series data; identifying a set of asset pairs based on the relationship information; validating the set of asset pairs based on one or more validation metrics; monitoring a data stream comprising information associated with the asset pairs to determine real-time changes in attributes for each asset of the set of asset pairs; detecting an anomaly associated with a first asset pair based on the monitoring; and in response to detecting the anomaly, generating a control signal configured to initiate detection of a cause of the anomaly associated with the first asset pair.

Clause 12: The non-transitory computer-readable medium of clause 11, wherein the operations for determining the relationship information comprise: determining, by the one or more processors, one or more similarity metrics between the first time series data and the second time series data; and determining, by the one or more processors, a correlation between the first asset and the second asset based on a weighted sum of the one or more similarity metrics.

Clause 13: The non-transitory computer-readable medium of clause 12, the operations comprising further comprising: adjusting, by the one or more processors, weights associated with the plurality of similarity metrics based on feedback data.

Clause 14: The non-transitory computer-readable medium of clause 12, wherein the data set comprises information corresponding to a plurality of asset groups, and wherein the one or more similarity metrics comprise two or more metrics selected from the list consisting of: a first metric determined based on a ratio of covariance between the first time series data and the second time series data; a second metric determined based on a difference between asset group allocations associated with the first asset and the second asset; a third metric determined based on vector representations of asset groups of the first asset and the second asset; and a fourth metric determined based on a graphical representation of the plurality of assets.

Clause 15: The non-transitory computer-readable medium of clause 11, wherein the operations for validating the asset pairs comprise: clustering, by the one or more processors, the plurality of assets into one or more clusters; and validating, by the one or more processors, the asset pairs based on whether both assets of each asset pair of the asset pairs are included in a same cluster of the one or more clusters.

Clause 16: The non-transitory computer-readable medium of clause 11, wherein the operations for detecting the anomaly comprise: determining a difference between a behavior of the first asset relative to a behavior of the second asset; and detecting the anomaly when the difference in behavior satisfies an anomaly detection criterion, wherein the anomaly detection criterion is a threshold difference.

Clause 17: The non-transitory computer-readable medium of clause 11, the operations further comprising reducing the identified asset pairs to produce a reduced set of asset pairs, wherein the monitoring is performed based on the reduced set of asset pairs.

Clause 18: The non-transitory computer-readable medium of clause 11, wherein the operations for detecting the anomaly comprise: identifying a master asset and one or more sister assets corresponding to the master asset; and validating a presence of the anomaly when the anomaly is detected with respect to the master asset and one or more of the sister assets.

Clause 19: The non-transitory computer-readable medium of clause 11, wherein the plurality of assets comprise a plurality of traded assets or a plurality of network elements.

Clause 20: A system for anomaly data detection, the system comprising: a memory; and one or more processors communicatively coupled to the memory, the one or more processors configured to perform the steps of the method of any of clauses 1-9.

Claim 21: The system of clause 20, wherein the one or more processors are configured to perform the steps of the method of clause 10.

Claim 22: The system of clause 20, wherein the assets comprise network elements.

It is noted that certain aspects of the present disclose have been described as operating or performing certain acts (e.g., making determinations, detection of anomalies, etc.) in real-time. As used herein, the term real-time means near real-time or substantially real-time (e.g., within milliseconds, between 1-2 second, 1-4 seconds, 1-10 seconds, less than 30 seconds, less than 1 minute). For example, in accordance with the techniques disclosed herein a time series data stream may be processed an anomaly may be detected in real-time, but there may be some delay between the anomaly occurring and detection due to transport latency during transmission of the time series data over a network from a data source to the anomaly detection device and processing delay as the time series data is analyzed in accordance with the techniques described herein.

As noted above, while examples described herein refer to traded assets, in some aspects the techniques described herein may be applied to other types of assets. For example, network elements (e.g., network devices, services, components, etc.) may exhibit similar behaviors over time and time series data representing the behavior of network devices may be used to identify network element pairs. These network element pairs may be monitored based on one or more performance metrics to identify when behavior of one network element deviates from the behavior of similar network elements identified in network element pairs with the monitored network element(s). Accordingly, it is to be appreciated that the concepts disclosed herein may be applied in contexts involving anomaly detection for assets other than traded assets and the term "assets" should not be limited to traded assets.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:
1. A method for anomaly data detection, comprising:
receiving, by one or more processors, a data set corresponding to a plurality of assets, wherein the plurality of assets comprises a first asset and a second asset, and wherein the data set comprises first time series data associated with the first asset and second time series data associated with the second asset;

27
28 determining, by the one or more processors, relationship information between pairs of assets of the plurality of assets based on at least a portion of the data set, wherein the relationship information comprises information corresponding to a relationship between the first asset and the second asset determined based on the first time series data and the second time series data;

identifying, by the one or more processors, a set of asset pairs based on the relationship information;

validating, by the one or more processors, the set of asset pairs based on one or more validation metrics;

monitoring, by the one or more processors, a data stream comprising information associated with the asset pairs to determine real-time changes in attributes for each asset of the set of asset pairs; detecting, by the one or more processors, an anomaly associated with a first asset pair based on the monitoring; and in response to detecting the anomaly, generating, by the one or more processors, a control signal configured to initiate detection of a cause of the anomaly associated with the first asset pair.

2. The method of claim 1, wherein determining the relationship information comprises:

determining, by the one or more processors, one or more similarity metrics between the first time series data and the second time series data; and determining, by the one or more processors, a correlation between the first asset and the second asset based on a weighted sum of the one or more similarity metrics.

3. The method of claim 2, further comprising:

adjusting, by the one or more processors, weights associated with the plurality of similarity metrics based on feedback data.

4. The method of claim 2, wherein the data set comprises information corresponding to a plurality of asset groups, wherein the one or more similarity metrics comprise two or more metrics selected from the list consisting of:

a first metric determined based on a ratio of covariance between the first time series data and the second time series data;

a second metric determined based on a difference between asset group allocations associated with the first asset and the second asset;

a third metric determined based on vector representations of asset groups of the first asset and the second asset; and a fourth metric determined based on a graphical representation of the plurality of assets.

5. The method of claim 1, wherein validating the asset pairs comprises:

clustering, by the one or more processors, the plurality of assets into one or more clusters; and validating, by the one or more processors, the asset pairs based on whether both assets of each asset pair of the asset pairs are included in a same cluster of the one or more clusters.

6. The method of claim 1, wherein the detecting of the anomaly comprises:

determining, by the one or more processors, a difference between a behavior of the first asset relative to a behavior of the second asset; and detecting, by the one or more processors, the anomaly when the difference in behavior satisfies an anomaly detection criterion.

7. The method of claim 6, wherein the anomaly detection criterion is a threshold difference.

8. The method of claim 1, further comprising:

reducing, by the one or more processors, the identified asset pairs to produce a reduced set of asset pairs, wherein the monitoring is performed based on the reduced set of asset pairs.

9. The method of claim 1, wherein the detecting of the anomaly comprises:

identifying, by the one or more processors, a master asset and one or more sister assets corresponding to the master asset; and validating, by the one or more processors, a presence of the anomaly when the anomaly is detected with respect to the master asset and one or more of the sister assets.

10. The method of claim 1, wherein the plurality of assets comprise a plurality of traded assets.

11. A non-transitory computer-readable medium storing instructions that, when executed by one or more processors, cause the one or more processors to perform operations for anomaly data detection, the operations comprising:

receiving a data set corresponding to a plurality of assets, wherein the plurality of assets comprises a first asset and a second asset, and wherein the data set comprises first time series data associated with the first asset and second time series data associated with the second asset;

determining relationship information between pairs of assets of the plurality of assets based on at least a portion of the data set, wherein the relationship information comprises information corresponding to a relationship between the first asset and the second asset determined based on the first time series data and the second time series data;

identifying a set of asset pairs based on the relationship information;

validating the set of asset pairs based on one or more validation metrics;

monitoring a data stream comprising information associated with the asset pairs to determine real-time changes in attributes for each asset of the set of asset pairs;

detecting an anomaly associated with a first asset pair based on the monitoring; and in response to detecting the anomaly, generating a control signal configured to initiate detection of a cause of the anomaly associated with the first asset pair.

12. The non-transitory computer-readable medium of claim 11, wherein the operations for determining the relationship information comprise:

determining, by the one or more processors, one or more similarity metrics between the first time series data and the second time series data; and determining, by the one or more processors, a correlation between the first asset and the second asset based on a weighted sum of the one or more similarity metrics.

13. The non-transitory computer-readable medium of claim 12, the operations comprising further comprising:

adjusting, by the one or more processors, weights associated with the plurality of similarity metrics based on feedback data.

14. The non-transitory computer-readable medium of claim 12, wherein the data set comprises information corresponding to a plurality of asset groups, and wherein the one or more similarity metrics comprise two or more metrics selected from the list consisting of:

a first metric determined based on a ratio of covariance between the first time series data and the second time series data;

a second metric determined based on a difference between asset group allocations associated with the first asset and the second asset;

a third metric determined based on vector representations of asset groups of the first asset and the second asset; and a fourth metric determined based on a graphical representation of the plurality of assets.

15. The non-transitory computer-readable medium of claim 11, wherein the operations for validating the asset pairs comprise:

clustering, by the one or more processors, the plurality of assets into one or more clusters; and validating, by the one or more processors, the asset pairs based on whether both assets of each asset pair of the asset pairs are included in a same cluster of the one or more clusters.

16. The non-transitory computer-readable medium of claim 1, wherein the operations for detecting the anomaly comprise:

determining a difference between a behavior of the first asset relative to a behavior of the second asset; and detecting the anomaly when the difference in behavior satisfies an anomaly detection criterion, wherein the anomaly detection criterion is a threshold difference.

17. The non-transitory computer-readable medium of claim 11, the operations further comprising reducing the identified asset pairs to produce a reduced set of asset pairs, wherein the monitoring is performed based on the reduced set of asset pairs.

18. The non-transitory computer-readable medium of claim 11, wherein the operations for detecting the anomaly comprise:

identifying a master asset and one or more sister assets corresponding to the master asset; and validating a presence of the anomaly when the anomaly is detected with respect to the master asset and one or more of the sister assets.

19. The non-transitory computer-readable medium of claim 11, wherein the plurality of assets comprise a plurality of traded assets.

20. A system for anomaly data detection, the system comprising:

a memory; and one or more processors communicatively coupled to the memory, the one or more processors configured to:

receive a data set corresponding to a plurality of assets, wherein the plurality of assets comprises a first asset and a second asset, and wherein the data set comprises first time series data associated with the first asset and second time series data associated with the second asset;

determine relationship information between pairs of assets of the plurality of assets based on at least a portion of the data set, wherein the relationship information comprises information corresponding to a relationship between the first asset and the second asset determined based on the first time series data and the second time series data;

identify a set of asset pairs based on the relationship information;

validate the set of asset pairs based on one or more validation metrics;

monitor a data stream comprising information associated with the asset pairs to determine real-time changes in attributes for each asset of the set of asset pairs;

detect an anomaly associated with a first asset pair based on the monitoring; and in response to detecting the anomaly, generate a control signal configured to initiate detection of a cause of the anomaly associated with the first asset pair.

* * * * *